(12) United States Patent
Zhang et al.

(10) Patent No.: US 12,010,952 B2
(45) Date of Patent: Jun. 18, 2024

(54) PLANT-BASED COMPOSITIONS FOR THE PROTECTION OF PLANTS FROM COLD DAMAGE

(71) Applicant: WASHINGTON STATE UNIVERSITY, Pullman, WA (US)

(72) Inventors: Xiao Zhang, Richland, WA (US); Changki Mo, Richland, WA (US); Matthew David Whiting, Prosser, WA (US); Qin Zhang, Richland, WA (US)

(73) Assignee: WASHINGTON STATE UNIVERSITY, Pullman, WA (US)

( * ) Notice: Subject to any disclaimer, the term of this patent is extended or adjusted under 35 U.S.C. 154(b) by 157 days.

(21) Appl. No.: 17/359,727

(22) Filed: Jun. 28, 2021

(65) Prior Publication Data

US 2021/0321576 A1 Oct. 21, 2021

Related U.S. Application Data

(63) Continuation of application No. 17/064,139, filed on Oct. 6, 2020, now Pat. No. 11,122,751, which is a continuation-in-part of application No. PCT/US2019/044093, filed on Jul. 30, 2019.

(60) Provisional application No. 62/712,135, filed on Jul. 30, 2018.

(51) Int. Cl.
*A01G 13/06* (2006.01)
*B05D 1/02* (2006.01)
*C09D 105/14* (2006.01)
*C09D 197/00* (2006.01)
*C09D 197/02* (2006.01)

(52) U.S. Cl.
CPC ............ *A01G 13/065* (2013.01); *B05D 1/02* (2013.01); *C09D 105/14* (2013.01); *C09D 197/005* (2013.01); *C09D 197/02* (2013.01)

(58) Field of Classification Search
CPC .................................................. A01G 13/065
See application file for complete search history.

(56) References Cited

U.S. PATENT DOCUMENTS

| | | | | |
|---|---|---|---|---|
| 5,251,398 A | * | 10/1993 | Balassa | A62C 99/0009 47/2 |
| 7,516,573 B1 | * | 4/2009 | Glenn | A01G 13/00 47/58.1 FV |
| 2006/0112629 A1 | * | 6/2006 | Wright | A01G 24/23 47/9 |
| 2009/0258085 A1 | * | 10/2009 | Bach | A61P 17/00 424/600 |
| 2012/0100367 A1 | * | 4/2012 | Holtan | C09D 167/06 523/447 |
| 2015/0166836 A1 | * | 6/2015 | Liu | C09D 197/005 524/76 |
| 2015/0297371 A1 | * | 10/2015 | Zhang | C08B 15/00 435/68.1 |
| 2016/0002483 A1 | * | 1/2016 | Zhao | A23L 3/3463 106/18.32 |
| 2016/0168443 A1 | * | 6/2016 | Lafitte | C04B 20/1018 507/112 |
| 2017/0121908 A1 | * | 5/2017 | Holtan | D21D 1/20 |
| 2017/0183555 A1 | * | 6/2017 | Lillandt | A61K 8/731 |
| 2019/0048147 A1 | * | 2/2019 | Curry | C08J 5/005 |

OTHER PUBLICATIONS

Lu et al. (Food Research International 50, 2013, 121-128) (Year: 2013).*

* cited by examiner

*Primary Examiner* — Liam J Heincer
(74) *Attorney, Agent, or Firm* — WC&F IP

(57) ABSTRACT

Compositions and methods of protecting plants from cold damage are provided. In particular, the invention provides compositions comprising plant-based nano- and/or micron-sized particles which, when applied to plants or plant parts such as buds, form a non-hydrophilic deposit or film with low thermal conductivity, thereby conferring protection against damage from ice nucleation and cold stress.

4 Claims, 15 Drawing Sheets
(15 of 15 Drawing Sheet(s) Filed in Color)

Figure 2A    Figure 2B
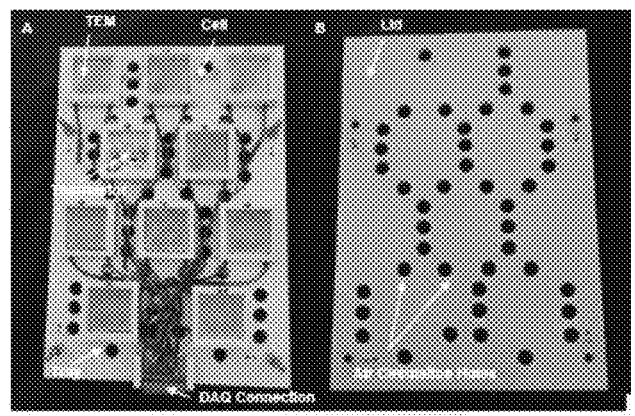
Figure 2C

Figure 3A                    Figure 3B

PLANT-BASED COMPOSITIONS FOR THE PROTECTION OF PLANTS FROM COLD DAMAGE

CROSS-REFERENCE TO RELATED APPLICATIONS

This application is a continuation of U.S. application Ser. No. 17/064,139 filed Oct. 6, 2020 which is a continuation-in-part of PCT Application No. PCT/US2019/044093, filed Jul. 30, 2019, which claims priority to U.S. patent application 62/712,135, filed Jul. 30, 2018.

STATEMENT OF FEDERALLY SPONSORED RESEARCH AND DEVELOPMENT

This invention was made with government support under grant number 2018-67009-27903 awarded by The United States Department of Agriculture. The United States government has certain rights in the invention.

BACKGROUND OF THE INVENTION

Field of the Invention

The invention generally relates to improved compositions and methods of protecting plants from cold damage. In particular, the invention provides compositions comprising dispersions of plant-based particles which, when applied to plants or plant parts such as buds, leaves, etc., form a non-hydrophilic deposition or film with low thermal conductivity, thereby conferring protection against damage from ice nucleation and cold stress.

Description of Related Art

The tree fruit industry is an important component of the U.S. agricultural sector, representing about 18% of $24.5 billion annual crop production[1]. Yield of these crops is determined largely by cross pollination during the brief, but critical, flowering period. During the transition from bud break to flowering, reproductive buds become increasingly susceptible to cold damage, a perennial threat that can cause severe economic losses[2]. The United Nations Food and Agriculture Organization reports that cold damage has caused more economic losses to crop in the U.S. than by any other weather hazard. A single freezing event can cause hundreds of millions of dollars in crop losses[3]. For example, nearly the entire crop (~90%) of apples and cherries in Michigan was lost due to cold damage in 2012[4].

Growers can utilize passive and/or active frost/freeze protection methods. Passive methods include site selection, cultivar selection, nutrient management, and cultural practices such as pruning and orchard floor preparation[5-7]. These methods are less costly yet generally provide less protection than active methods[7,8].

There are various active frost protection methods that growers can utilize during or prior to cold weather to reduce cold damage. These include wind machines[9], helicopters[10,11], heaters[12], wind machine/heater combinations[8] or sprinklers[10,13]. Typically these methods can raise temperatures by 2.8-3.3° C. when the sky is clear and there is little wind.[8] More specifically, wind machines can raise temperatures by 1.1-2.8° C.[7,10], and helicopters increased orchard air temperature up to 2.8-4.4° C. when hovering over trees during a radiative freeze. Oil- and propane-fuel heaters provide 2-2.5° C. protection, whereas wind machine and heater combinations can raise temperatures by 2.8-3.3° C.[8,12]. The use of over-tree sprinklers increases air temperatures of about −4 to −4.4° C. as long as the dew point in not less than −6° C.[5]. Each of these methods has drawbacks. For example, wind machines are noisy, expensive, and they do not provide protection if winds are greater than 2.2 m/s (5 mph), nor if there is a convective freeze. Environmental pollution from fuel-burning heaters can be problematic due to air pollution, and use of helicopters is expensive. Currently, there is no method can provide reliable and reproducible efficacy on protecting plant and its tissue from frost damage.

Applying coating materials (both edible and nonedible) for protecting fruits and seed from plants has been demonstrated using a number of materials including wax, cellulose nanocrystals, starch etc.[14-16] However, none of the prior work has discussed the use of plant based compounds for frost prevention by preventing ice formation on the surface of plant tissue.

When the temperature drops to −2 and −5° C.[17-19] damage to plant tissues under natural conditions can occur. At these temperatures, ice can form from supercooled water in such plants, propagate throughout the plants (inter- and intracellularly), and thus frost damage (ice formation, also called ice nucleation) occurs. The precise mechanism of ice nucleation in plants is not clear. It has been shown in general that hydrophilic substances favor ice nucleation whereas hydrophobic substances tend to prevent ice nucleation.[20] Cellulose materials, including, microcrystalline cellulose, fibrous cellulose and nanocrystalline cellulose, have been shown to be efficient ice-nucleating particles.[21,22] Nanostructured and superhydrophobic materials have been shown to prevent ice nucleation.[23,24] However, all these materials are made from compounds that pose health risks either to plants or to humans. No bio-based materials have been developed for preventing damage to plant tissues that results from frost and ice nucleation.

It would be highly advantageous to have available improved compositions and methods of protecting plants (e.g. fruit trees and other crops) from cold damage, in particular, to protect them from or increase their resistance to ice nucleation.

SUMMARY OF THE INVENTION

Provided herein are compositions for use in the protection of plants from cold damage, e.g. cold damage due to ice nucleation. The compositions are made from materials derived from plants and do not damage a plant when applied, yet they provide excellent protection against cold damage. The compositions and methods are especially useful for protecting e.g. buds and leaves while the plant is still in the field. Methods of protecting plants and/or plant parts from cold damage by applying the compositions are also provided.

It is an object of this invention to provide a method of preventing or limiting ice nucleation on buds of a plant, comprising the step of spraying onto the plant an aqueous composition which includes: at least one material selected from the group consisting of nano- and/or micro-particulate: i) soybean hulls; ii) sawdust; iii) xylan; and iv) xylan plus lignin; and at least one surfactant; wherein the step of spraying is performed so as to adhere the at least one material onto buds or bud sites of the plant, and wherein said spraying is performed prior to or during the plant being exposed to freezing temperatures. In some aspects, the at least one material is deposited on (adheres to) at least about 25% of the bud surface.

In additional aspects, the invention provides compositions comprising nano- and/or micron-sized particles that are or comprise at least one plant-based polysaccharide and/or at least one plant-based aromatic polymer; and a liquid carrier. In some aspects, the composition includes micron-sized particles having a size from about 1-200 microns, inclusive. In other aspects, the composition includes nano-sized particles having a size from about 1-1000 nm, inclusive. In further aspects, the at least one plant-based polysaccharide is cellulose, hemicellulose or xylan. In yet further aspects, the at least one plant-based aromatic polymer is lignin. In some aspects, the micron-sized particles are made from soybean hulls or sawdust. In other aspects, the liquid carrier is water or a mixture of water and at least one hydrophobic liquid. In additional aspects, the hydrophobic liquid is an aliphatic acid, an aliphatic alcohol or an aromatic alcohol and is present in an amount ranging from 1-20%, inclusive. In further aspect, the composition comprises at least one surfactant. In yet further aspects, the at least one surfactant is lignin or cetyl trimethylammonium bromide (CTAB). In some aspects, the composition comprises 2% xylan; xylan and lignin in a ratio of 3:2; or 2% nano-fibrillated soybean shells.

The invention also provides methods of preventing ice nucleation on or within a plant or plant part, comprising applying to the plant or a part of the plant one or more of the compositions described herein. In some aspect, the plant is selected from the group consisting of fruit trees, vegetable crops and ornamentals. In other aspects, the part of the plant comprises at least one of buds and leaves. In further aspects, the step of applying is performed by spraying. In additional aspects, the step of applying is performed at a temperature that is below 0° C.

The invention also provides a plant-based dispersion comprising 0.01%-99.99% of one or more materials selected from the group consisting of: plant-based nanofiber, cellulose, hemicellulose, lignin and pectin and an aqueous solvent. In some aspects, the plant-based dispersion comprises 0.001%-99.99% of one or more of a surfactant and a plant extractive. In other aspects, the aqueous solvent comprises water and a hydrophobic substance that increases the hydrophobicity of the dispersion.

The invention also provides a method of preventing ice sheet formation on or within a plant bud or plant tissue, comprising depositing one or more of any of the plant based dispersions described herein on the plant bud or plant tissue prior to formation of the ice sheet.

The invention also provides a method of promoting the formation of flowers, fruit and/or viable seeds in a plant that is or is likely to be exposed to freezing temperatures, comprising, depositing one or more of any of the plant based dispersions described herein on buds and/or tissues of the plant prior to or during exposure to the freezing temperatures.

The invention also provides a method preventing or limiting ice nucleation on buds of a plant, comprising the step of forming a non-hydrophilic deposit on buds or buds sites of a plant. The method is generally performed by spraying onto the plant an aqueous composition which includes: at least one material selected from the group consisting of nano- and/or micro-particulate: i) soybean hulls; ii) sawdust; iii) xylan; and iv) xylan plus lignin; and at least one surfactant; wherein the step of forming is performed so as to adhere the at least one material onto buds or bud sites of the plant, and wherein said spraying is performed prior to or during the plant being exposed to freezing temperatures.

Other features and advantages of the present invention will be set forth in the description of invention that follows, and in part will be apparent from the description or may be learned by practice of the invention. The invention will be realized and attained by the compositions and methods particularly pointed out in the written description and claims hereof.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 2A-C. The system used for differential thermal analyses (DTA) of sweet cherry and grape buds, comprised of four trays with 9 TEMs (A) and a lid (B) inside a Tenny T2 programmable freezer (C).

FIGS. 3A and B. Machine used for controlled freezing "Vending machine" experiments. A, placing a perforated cylinder in the machine; B, loaded machine.

DETAILED DESCRIPTION

Figure 1A:
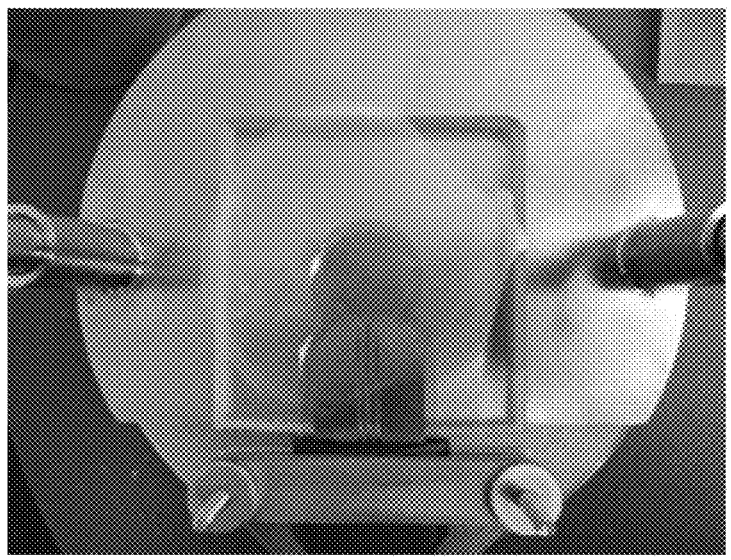
FIGS. 1A and B. A, TPS sensor and the CNC film; B, the closed experimental setup for measuring thermal conductivity.

The present disclosure provides compositions comprising plant-based nanomaterials for use in protecting plants and/or plant parts from damage and stress caused by cold. In particular, the formulations, when applied to a surface of a plant (e.g. plant buds or leaves), prevent ice from nucleating at or on the surface or within cells of the plant. When applied, the compositions form a layer (deposit, film, coating, etc.) having low thermal conductivity. The deposit is generally non-hydrophilic, i.e. it does not or does not readily absorb or attract water. The presence of the deposit or film during low temperature events prevents ice from nucleating and thus protects the plant/plant part from damage to plant tissue that would otherwise occur. It is noted that complete coverage of e.g. a bud is not necessary to prevent ice formation. Generally, the dispersion is deposited on about 10% or more of the bud surface, e.g. about 5, 10, 15, 20, 25, 30, 35, 40, 45, 50, 55, 60, 65, 70, 75, 80, 85, 90 or 95% of the surface is covered by the deposit. Thus, in some aspects, the invention comprises methods which include a step of forming a non-hydrophilic film or deposit on a surface of a plant, such as on at least a portion of the surface of a plant bud, to prevent or reduce the amount of ice nucleation on the plant bud, when/if the plant is exposed to freezing temperatures e.g. below about 0° C. such as about −1, −2, −3, −4, −5, −6, −7, −8, −9 or −10° C. The deposits that are formed may be hydrophobic or neutral, with respect to their tendency to absorb or attract water, or may be amphipathic, but they generally are not hydrophilic so that water does not form uniform sheets on the deposits, and ice nucleation is prevented, interrupted or lessened in or on sections of the plant covered by the deposit.

The formulations are plant based dispersions comprising plant polysaccharides (e.g. xylan, mannan, cellulose, and/or pectin) and, typically (optionally) one or more surface active components such as a plant phenolic compound (e.g. lignin) and/or one or more surfactants (e.g. CTAB). Surprisingly, the dispersions have shown a significant efficacy with respect to preventing ice nucleation and frost damage when applied to plants. The compositions may be organic, i.e. all plant components are prepared only from plants that are grown without the use of pesticides, synthetic fertilizers or sewage sludge; are not genetically modified; and have not been exposed to ionizing radiation that is not naturally occurring.

Definitions

"Cold damage" or "cold stress" refers to damage that is caused e.g. by ice nucleation on surfaces of a plant or plant part or within the cells of a plant or plant part. Ice nucleation typically occurs at ambient temperatures at, near or below 0° C.

"Plant" refers to a multicellular organism in the kingdom Plantae that uses photosynthesis to make its own food. The present disclosure deals mainly with Angiosperms, both dicotyledons and monocotyledons, and especially with flowering plants and trees that bear produce such as fruits or vegetables.

"Plant part" refers to any part of a plant at any time during its life cycle. As used herein, a "plant part" generally refers to portions of the plant that are above ground, i.e. not underground. Plant parts include but are not limited to the following, at all stages of development: leaves, stems, canes, buds, flowers, fruits, seeds, nuts, shells, hulls, roots. Of particular interest for the practice of the invention are buds and flowers.

"Low Temperature Exotherm" (LTE) refers to the temperature at which intracellular water freezes. This temperature changes throughout the dormant season as buds acclimate to the colder winter temperatures and de-acclimate to the warmer spring temperatures. Regardless of the time of season, producers strive to prevent their vines from reaching the LTE. In particular, LTE 10 refers to the temperature at which 10% of the primary buds will die as a result of the intracellular water freezing within the primary bud. LTE 50 refers to the temperature at which 50% will die and LTE 90 the temperature at which 90% will die.

"Nanocellulose" is a term referring to nano-structured cellulose, e.g. cellulose nanocrystal (CNC or NCC), cellulose nanofibers (CNF) also called microfibrillated cellulose (MFC), or bacterial nanocellulose, which refers to nano-structured cellulose produced by bacteria. CNF is composed of nanosized cellulose fibrils with a high aspect (length to width) ratio e.g. 5-20 nanometers with a wide range of lengths, typically several micrometers. CNF is a pseudo-plastic and exhibits thixotropy (thick/viscous under normal conditions, but becoming less viscous when shaken or agitated). The fibrils are isolated from any cellulose containing source including wood-based fibers (pulp fibers) through high-pressure, high temperature and high velocity impact homogenization, grinding or microfluidization. Alternatively, acid hydrolysis of a cellulose containing source gives rise to rigid, highly crystalline nanoparticles which are shorter (100 s to 1000 nanometers), i.e. cellulose nanocrystals (CNC).

"Hemicellulose" (also known as polyose) is present along with cellulose in almost all terrestrial plant cell walls. Unlike cellulose, hemicelluloses are composed of pentoses (xylose and arabinose), hexoses (mannose, glucose, and galactose), and sugar acids.

"Surface active agents" or "surfactants" are compounds that lower the surface tension (or interfacial tension) between two liquids, between a gas and a liquid, or between a liquid and a solid. For example, the cationic detergent CTAB is a surface active surfactant that lowers the surface (interfacial) tension between the liquid of the disclosed liquid formulations and the surface of a plant to which a formulation is applied. Surface active agents also afford hydrophobicity.

Hydrophilic: having a tendency to mix with, dissolve in, or be wetted by water.

Hydrophobic: tending to repel or failing to mix with water.

Amphipathic; having both hydrophilic and hydrophobic parts.

Compositions

Provided herein are plant based compositions that prevent ice nucleation on surfaces to which they are applied. The compositions are "plant based" because they comprise, as active agents, components derived chiefly or entirely from plants. That is, at least about 90% (e.g. about 90, 91, 92, 93, 94, 95, 96, 97, 98, 99 or 100%) of the components are of plant origin and are synthesized by and/or isolated from plants. The components include, for example, one or more plant polysaccharides and/or one or more plant phenolic compounds. In the compositions, the components are optionally combined with one or more surface active agents, which may or may not be of plant origin.

Key characteristics of the compositions and/or of the materials used in the compositions include:
the ability to form a stable formulation when a sufficient quantity of active agent(s) (sufficient to prevent ice nucleation on a surface) is present;
the ability to form a hydrophobic deposit (e.g. film, layer, deposit, etc.) on plant tissue surfaces;
a high affinity for the plant tissue surface so a deposit layer or film formed from the composition remains on a surface after application, at least for a period of time sufficient to provide the necessary cold protection;
- the materials in the compositions are not toxic or harmful to the plants, insects or animals; and
- the components are generally completely biodegradable.

The exemplary compositions described herein have one or more, or all, of these characteristics.

Examples of Components

Polysaccharides

Examples of plant polysaccharides that can be used in the compositions include but are not limited to: xylan, mannan, cellulose, hemicellulose, pectin, etc.

In particular, xylan (CAS number: 9014-63-5) refers to a group of hemicelluloses that represents the third most abundant biopolymer on earth. It is found in plants, in the secondary cell walls of dicots and all cell walls of grasses. Xylans are polysaccharides made up of β-1,4-linked xylose (a pentose sugar) residues with side branches of α-arabinofuranose and α-glucuronic acids and contribute to cross-linking of cellulose microfibrils and lignin through ferulic acid residues. Xylan can be categorized into three classes on the basis of substituted groups i) glucuronoxylan (GX) ii) neutral arabinoxylan (AX) and iii) glucuronoarabinoxylan (GAX). Sources of xylans include many agricultural crops such as straw, sorghum, sugar cane, corn stalks and cobs, and hulls and husks from starch production, as well as forest and pulping waste products from hardwoods and softwoods. Xylans are readily isolatable from such sources and/or are readily available from commercial sources.

Mannan is one of the major constituent groups of hemicellulose in the wall of higher plants. It comprises linear or branched polymers derived from sugars such as D-mannose, D-galactose, and D-glucose. The principal component of softwood hemicellulose is glucomannan Plant mannans have β (1-4) linkages and are a form of storage polysaccharide. Mannans obtained from plants generally include galactomannans from guar and locust beans, glucomannan from konjac tubers, and galactoglucomannan from spruce wood. Mannans are readily isolatable from such sources and/or are readily available from commercial sources.

Pectin is a structural heteropolysaccharide contained in the primary cell walls of terrestrial plants. It is produced commercially as a white to light brown powder, and comprises a complex set of polysaccharides, including e.g. heterogalacturonans and substituted galacturonans Isolated pectin has a molecular weight of typically 60,000-130,000 g/mol, varying with origin and extraction conditions. Pectin is readily isolatable from a variety of sources (e.g. citrus fruit) and is readily available from commercial sources.

Cellulose is an insoluble substance which is the main constituent of plant cell walls and of vegetable fibers such as cotton. It is a polysaccharide consisting of chains of glucose monomers. While insoluble in the natural state, cellulose nanoparticles such as cellulose nanocrystals (CNC), cellulose nanofibers, etc. can be solubilized. For example, see US patent application publication US 2016/0002483, the complete contents of which is hereby incorporated by reference.

In some aspects, the compositions comprise nanocellulose, in particular, cellulose nanocrystals (CNC, also abbreviated as NCC). CNC is an abundant natural biopolymer so the compositions are advantageously economical to use. For example, the CNC can be extracted from wood biomass and treated to form gel, liquid, and solid forms with excellent mechanical and thermal conductivity properties. In addition, CNC is "environmentally friendly"; CNC is biodegradable and does not leave an undesirable chemical residue on plants or in the soil. In some aspects, the invention provides methods of using such low thermal conductivity CNC to improve fruit bud resistance to cold damage.

Other Components

Other plant-derived components may also be included in the compositions. Examples include but are not limited to: phenolic compounds (e.g. lignin) and one or more plant extractives or extracts (e.g. fatty acids, resin acids, lipids and sterols).

Material Size

The liquid compositions disclosed are typically solutions or dispersions. The particles in the liquid compositions range in size from nanoparticles (e.g. from about 1 to 1000 nm in one or more dimensions, such as about 1, 10, 50, 100, 150, 200, 250, 300, 350, 400, 450, 500, 550, 600, 650, 700, 850, 800, 850, 900, 950 or 1000 nm) to micron-sized particles, e.g. from about 1 to about 500 micrometers (microns) in one or more dimensions (such as about 1, 5, 10, 20, 30, 40, 50, 60, 70, 80, 90, 100, 150, 200, 250, 300, 350, 400, 450 or 500 microns. In some aspects, the particles are nano-sized and the liquid compositions may be termed "solutions" or even "colloids". In other aspects, at least some of the particles are micron-sized (e.g. up to about 500 microns) and the liquid compositions may be termed "dispersions". In some aspects, the particles in a formulation include a mix of nano- and micron-sized particles (e.g. from about 10 nm to about 500 microns), and the mixture may also be referred to as a dispersion. Technically, when, for example, cellulose, xylan and lignin nanoparticles are used, they would be mostly in colloid form and have very good stability in liquid formulations. Alternatively, when nanofibers of e.g. soybean shells are present, there are a large portion (e.g. about 20% or more such as about 20, 30, 40, 50, 60, 70, 80, 90 or 100%) of micron-sized particles. Some particles, such as "nanofibers" typically have a nanoscale width and a micron-scale length.

The exact dimensions of the particles is not necessarily critical, so long as a "sprayable" liquid of suitable viscosity is formed with a sufficient amount of particles to provide protection from ice nucleation. Those of skill in the art will recognize that, when the average size of e.g. more than about 50% of the particles is greater than about 100-200 microns, a liquid formulation can tend to clog the nozzle of sprayers. This, and also, particle agglomeration, are avoided in the liquid formulations disclosed herein by adjusting the particle size (e.g. to about 500 microns or less, such as about 500, 400, 300, 200 or 100 microns or less; or 200 microns or less, such as about 200, 150, 100 or 50 microns) and/or by adding one or more surfactants to the liquid formulations.

A further consideration is that the films or deposits formed by spraying the formulations onto a plant or plant surface should not be readily visible after the composition is applied. This is generally accomplished by keeping the particle size lower than e.g. about 500 microns (e.g. less than about 500 microns or less, such as about 500, 400, 300, 200 or 100 microns or less). In some aspects, a particle size between 1 micron to 20 microns is used. When a surfactant is included, particles sizes above 50 microns (e.g. up to about 100, 200, 300, 400 or 500 microns, e.g. about 200 microns or less) can be used.

In some embodiments, the components of the compositions are used in an isolated or purified or partially purified form (e.g. as obtained from a commercial source) as described above. However, in some aspects, the plant source itself is used after being transformed to nanoparticulate (e.g. about 1-1000 nm) and/or micron size (e.g. about 1 μm to 1000 μm).

Those of skill in the art are familiar with the production of nano- and/or micron-sized material from macroscopic materials. Methods to reduce starting materials to suitably sized particles include but are not limited to: milling, grinding, shearing (e.g. in a "blender"), chemical modifications such as hydrolysis, oxidation, etc. The resulting particles may be of any shape, e.g. roughly spheroid, cuboid, fibrils, sheet-like, etc.

The particles used in the compositions described herein may be derived from a variety of plant sources, residues or waste. Examples include but are not limited to: hulls and shells of legumes (e.g. lentils, peas, chickpeas, beans, soybeans and peanuts); sawdust; plant stems; straw; leaves; nut shells; corn husks and stalks; seeds and/or seed coats; etc. Any of these plant-based materials may be processed to form nano- and/or micron-sized particles, nanofibrils, etc. and used in the practice of the invention.

Surfactants and Other Components

In some aspects, the compositions also comprise one or more surface active agents or surfactants. Examples of surfactants that may be used include but are not limited to: cetyl trimethylammonium bromide CTAB); non-ionic surfactants such as RANIER EA®, the plant phenol lignin, polysorbate surfactants (or TWEEN® surfactants), e.g., polyoxyethylene (20) sorbitan monolaurate, also referred to as "TWEEN® 20," or polyoxyethylene (80) sorbitan monolaurate, also referred to as "TWEEN® 80"; sorbitan surfactants (or SPAN® surfactants), e.g., sorbitan monolaurate, also referred to as "SPAN® 20," or sorbitan monooleate, also referred to as "SPAN® 80"; and combinations thereof); etc.

In some aspects, the surface active material is a lignin. Various forms of lignin may be used, e.g. kraft lignin, a product of the sulfate pulping process, or lignosulfonate which is sulfonated; polymer-grafted lignin formed by grafting one or more hydrophilic polyalkylene oxide polymers with lignin, such as those described in US Patent Publication 20180078916; lignin extracted from plant by organic solvent, such as ethanol, acetone, acetic acid methanol or deep eutectic solvent or ionic liquor, etc. By using lignin as a hydrophobic surfactant (e.g. when mixed with xylan or CNC or nano-fibrillated soybean shells) the formulations advantageously avoid the use of any chemical surfactants.

In some aspects, various organic acids, which may or may not be plant-derived organic acids, are included in the compositions. Examples include but are not limited to: citric acid, succinic acid, fatty acids resin acid, etc.

Liquid Carriers

Prior to application to a plant, the components of the compositions are mixed with a liquid carrier that is suitable for applying the composition to a or plant/plant part. Suitable carriers are generally aqueous based, including but not limited to water, and/or water which includes e.g. one or more hydrophobic compounds (in addition to or in place of a surfactant). The dielectric constant of water is 80 at 20° C., and the aqueous-based solvents will generally have a dielectric constant $\varepsilon > 60$ at 20° C. if blended with a very hydrophobic compound. For example, in some aspects, the solvent is comprised of 90% water and 10% hydrophobic compound and has $\varepsilon = 80*90\% + 1*10\% = 72$.

"Hydrophobic substances" that can be blended with water to form suitable solvents include but are not limited to: aliphatic acids and their derivatives (e.g. esters, salts, sulfonates), aliphatic alcohols and their derivatives (e.g. esters, ethers), aromatic alcohols and their derivatives (e.g. phenols, phenolic acids).

Amounts

The amount of the nano- or micron-sized particulate plant-based material in the compositions generally range from about 0.01%-99.99% (i.e. "wt %") referring to either a single polysaccharide/particulate material, or to an individual species if more than one type is included (i.e. a mixture), or to the combined total of multiple species of particles. In some aspects, the amount ranges from about 0.01 to about 50%. Thus, the amount ranges, e.g. from about 0.01 to 1%, such as about 0.01, 0.02. 0.03. 0.04, 0.05, 0.06, 0.07, 0.08, 0.09 or 1.0%; or from about 1 to 10%, such as about 1, 2, 3, 4, 5, 6, 7, 8, 9 or 10%; or from about 10 to 99.99% such as about 10, 15, 20, 25, 30, 35, 40, 45, 50, 55, 60, 65, 70, 75, 80, 85, 90, 95 or 99.99%. Individual amounts between those listed are included, up to two decimal places, e.g. between 10 and 15, values of 10.00, 10.01, 10.02, etc. are encompassed.

The amounts of the one or more surface active agents is generally in the range of from about 0.001%-99.99% (also "wt %"), such as about from 0.001 to 0.01 (about 0.001, 0.002, 0.003, 0.004, 0.005, 0.006, 0.007, 0.008, 0.009 or 0.01); and including the ranges listed above for polysaccharides and nanoparticles.

Commercial Products and Uses

In some aspects, the compositions are liquid compositions suitable for direct application to plants and/or plant parts "as is". In other aspects, the compositions are provided in a concentrated form that can be diluted by the end-user before use. In yet other aspects, the compositions are provided as one or more dry mixtures which can be reconstituted by the end user prior to use, e.g. the plant-based polysaccharides with one or more surface active agents as a dry mixture (or as separate dry mixtures) that is/are reconstituted with a suitable carrier before use.

The end-user of the compositions may be, for example, a farmer or large agribusiness whose plants are grown on a commercial scale, e.g. large orchards of fruit trees, multi-acre fields of vegetables or ornamentals, numerous greenhouses, etc. Alternatively, the end-user may be an individual who wishes to provide cold protection on a smaller scale, e.g. in a personal garden, on a deck, etc. or a municipality in need of protection for plantings in a park. The compositions may be packaged and provided on any scale, large or small, to fit the needs of the end-user.

Methods

Provided herein are methods of protecting plants and/or plant parts from ice nucleation. The methods include a step of applying a composition of the invention to surfaces of a plant or plant part. In some aspects, the composition is applied to the entire plant, e.g. to entire seedlings or young plants; in other aspects, the composition is application to a portion of the plant e.g. to branches, stems, stalks, etc. The application target may be, for example, buds or flowers of the plant or tree; however, since the compositions are non-toxic, generally application is to a larger area, such as an entire branch, and entire bush, etc.

The compositions may be applied by any suitable technique. Examples include but are not limited to: by spraying (e.g. by electrostatic spray); misting; or another suitable technique. Any suitable application technique may be used, preferably so long as a uniform or relatively uniform coating of the composition is applied.

Generally, compositions are applied at a rate of from about 10 to about 400 gallons per acre, depending on the size and stage of development of the targeted plant. For example, for large, mature apple trees, 400 gal/acre may be appropriate; for large, mature peaches, 300 gals/acre and for e.g. berries, 200 gals/acre. In other aspect, large mature trees receive about 50 gallons per acre dwarf and semi-dwarf trees receive about 40 gallons per acre, young dwarf plantings in their third and fourth leaf receive about 25 gals/acre and new, non-bearing plantings receive about 10 gals/acre.

The deposit layers, film or coating that is applied generally ranges from about 1 micron to about 200 microns in thickness, with a preferred thickness being from about 10 microns to about 100 microns, such as about 10, 20, 30, 40, 50, 60, 70, 80, 90 or 100 microns in thickness, especially for dispersions comprising micron sized particles, to confer sufficient protection from cold damage.

In some aspects, a single application of the compositions is sufficient to protect plants. However, if lengthened periods (e.g. consecutive days or weeks) of freezing temperatures are predicted; and/or if multiple periods of freezing temperatures are predicted (e.g. space apart by days, weeks or months), multiple applications of the compositions may be made without harming the plants, and without interfering with normal plant development, e.g. opening of buds and the growth of ornamentals and fruit.

In addition, the applications can be performed at any stage of bud development. For example, apples trees undergo dormant, silver tip, green tip, half-inch green, tight cluster, pink, full bloom, petal fall and fruit set stages, and the compositions may be applied during any of these. For cherry trees, recognized stated may include: late dormant, white bud, bloom, petal fall and shuck split/fruit set.

Plants which can be Protected

Types of plants that can be protected from ice nucleation using the methods of the invention include all types of fruits, vegetables, and ornamentals but are not limited to: fruit trees, vines and bushes and plants that bear berries or vegetables, etc., including but not limited to: cherries, grapes, blueberries apples, strawberries bananas, mangoes, papayas, avocado, tomatoes, potatoes, beans, squash, cucumbers, pears, peaches, ornamental plants (e.g. roses and other flowering plants), etc. Plants of any type of orchard, crop, vineyard or garden may be treated, with fruit trees being of particular interest.

It is to be understood that this invention is not limited to particular embodiments described herein above and below, and as such may, of course, vary. It is also to be understood that the terminology used herein is for the purpose of describing particular embodiments only, and is not intended to be limiting.

Where a range of values is provided, it is understood that each intervening value between the upper and lower limit of that range (to a tenth of the unit of the lower limit) is included in the range and encompassed within the invention, unless the context or description clearly dictates otherwise. In addition, smaller ranges between any two values in the range are encompassed, unless the context or description clearly indicates otherwise.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

EXAMPLES

Example 1. Measuring Thermal Conductivity and Ice Nucleation Damage

Thermal Conductivity Measurement of CNC Film

Figure 1B:
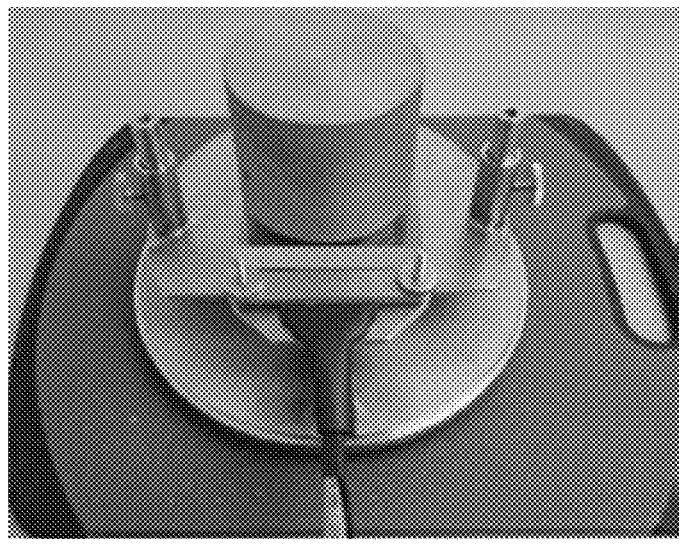

To measure thin film thermal conductivity, the films were placed in a TPS 2500 S Thermal Property System (Thermtest Inc., Canada), shown in FIG. 1A. The TPS 2500 S measures thermal conductivity from 0.001 to 1800 W/mK. For example, using CNC films, the through-plane test module was used as follows: two thin CNC films were placed above and below the TPS or Hot Disk sensor (Xu et al. 2014). The samples were measured with 10 pounds of pressure applied to the testing setup, to press the sample pieces flat against the testing sensor as shown in FIG. 1B.

Measurement of Damage

Freezing damage determination was conducted using either a Differential Thermal Analysis (DTA) or a "Vending Machine"-style controlled freezing machine, as described below.

Differential Thermal Analysis (DTA)

Differential thermal analyses were conducted using a programmable freezer (Model T2, Tenney SPX, Rochester, NY) with a temperature range of −75° C. to 200° C. in which four trays were installed as shown in FIG. 2B. Each tray had 9 thermoelectric modules (TEMs), each of which was positioned within a cell as depicted in FIG. 2A. Each tray also had a thermistor in a control well in which no bud samples were placed to account for signal noise common to all samples. The DTA system includes a data acquisition system (Keithley Instruments model 2700-DAQ-40, Cleveland, OH) that detects the temperature gradients generated by exotherms and provides a voltage reading by converting the thermal signals to mV. This output voltage was exported to an Excel spreadsheet using the ExcelLINX Program (Emcore Corp, Somerset, NJ) and the data was analyzed visually by comparing the spreadsheets.

For each DTA test, buds collected from the field were wrapped with aluminum foil (3 to 5 buds per cell), placed on a TEM, and each cell was then covered with a foam pad (4×4×9 mm) to improve the contact between the TEM and the wrapped buds. A PVC lid (6 mm) with holes for air circulation between trays was also present. The freeze chamber was programmed as follows: hold 4° C. for 1 hour; then the temperature drops until reaching −40° C. within 11 hours with rate of temperature drop of 4° C./hr; hold for one hour at −40° C.; then increase the temperature back to 4° C. within 10 hours.

The results of the treated and untreated samples and the relationship between the air temperature within the freezer and TEM voltage output in mV were analyzed, and the temperatures at which 10%, 50% or 90% of the buds were killed (LT10, LT50, and LT90, respectively) were determined as described in detail below.

Controlled Freezing Method "Vending Machine"

A "Vending Machine" style system designed by the WSU— Irrigated Agriculture Research and Extension Center (IAREC) was also used to determine the lethal temperatures for buds and/or the bloom growth. The machine, shown in FIGS. 3A and B, is a programmable automated freezer that exposes the samples to different temperatures for different time durations.

Using this system, lethal temperatures were checked from 0° C. to −9° C. with 1° C. decrements and temperature drop rate of 4° C./hr. The machine has four plastic racks with different colors (blue, black, red, and green) inside the climate chamber to hold the samples. To make sure that the samples are fully exposed to designated temperatures, the samples were wrapped with aluminum foil and placed in perforated cylinders as illustrated in FIG. 3A. At a designated temperature, a sample is automatically released (ejected) from the rack through a door closed with a one-way flap and into a basket outside the chamber. After ejection from the machine, the samples were held for 24 hours at room temperature to thaw rapidly, or at 2° C. to thaw slowly (Warmund et al., 1992). During thawing, dead tissue changes to a brown color (Gutierrez et al., 2016). The buds were then dissected using a sharp blade and the mortality percentage of the bud tissues was evaluated using a stereomicroscope (Leica EZ4 HD) with Leica LAS EZ software (Gutierrez et al., 2014).

Example 2. Plant Based Dispersions

Plant based dispersions were formulated using plant polysaccharides (xylan, mannan, cellulose, pectin) and plant phenolic compounds (lignin) in combination with a surface active agent (CTAB). To our surprise, a few of the dispersions have shown a significant efficacy on preventing frost protection.

Figure 4A:
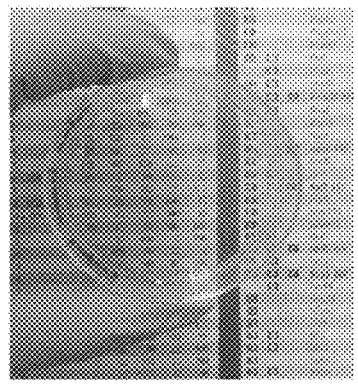
FIG. 4A-C. Film samples formed by spraying A, 2% xylan, B, 2% xylan/lignin and C, 2% nano-fibrillated soybean hulls (shells).
Figure 4B:
Figure 4C:
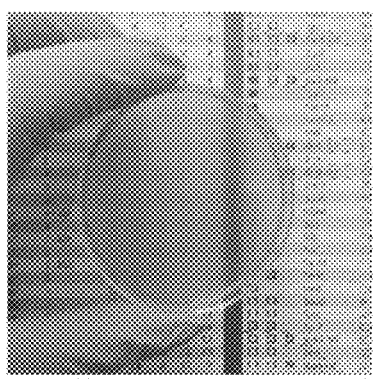
Figure 5:
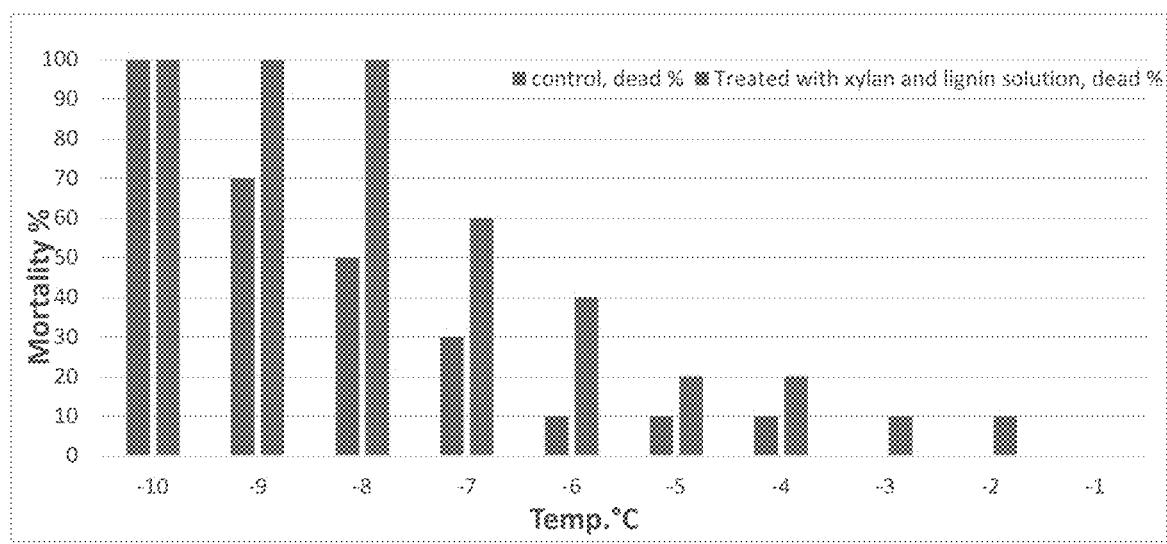
FIG. 5. Comparison of fruit bud mortality between control samples and samples treated with a dispersion containing a mixture of xylan and lignin (2 wt %).
Figure 6A:
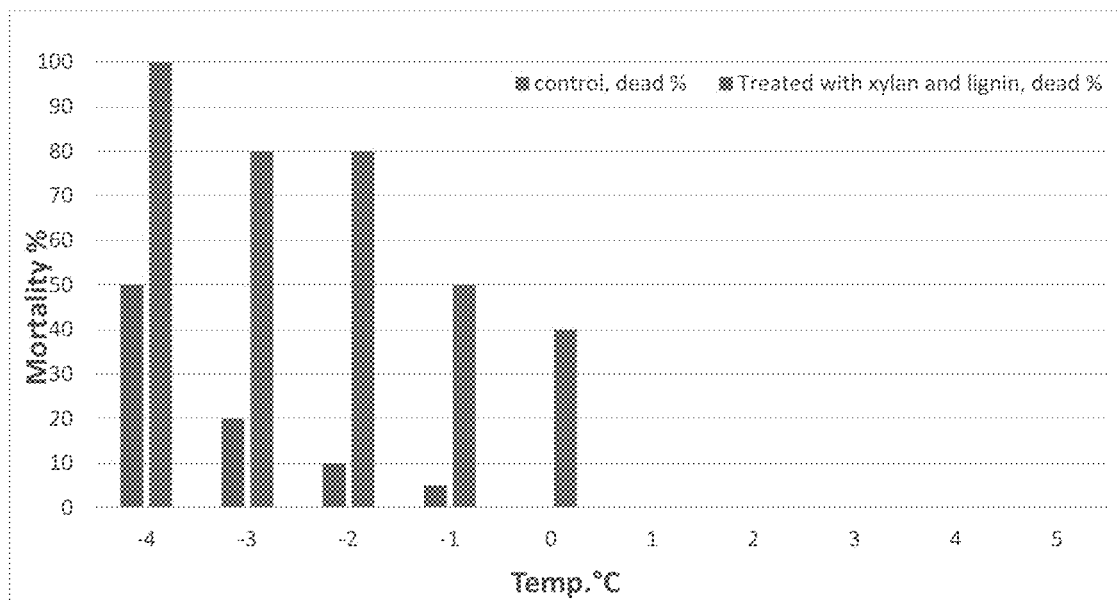
FIGS. 6A and B. Comparison of tomato leaves mortality between control samples and samples treated with a dispersion containing a mixture of xylan and lignin. A, bar graph; B, line graph.
Figure 6B:
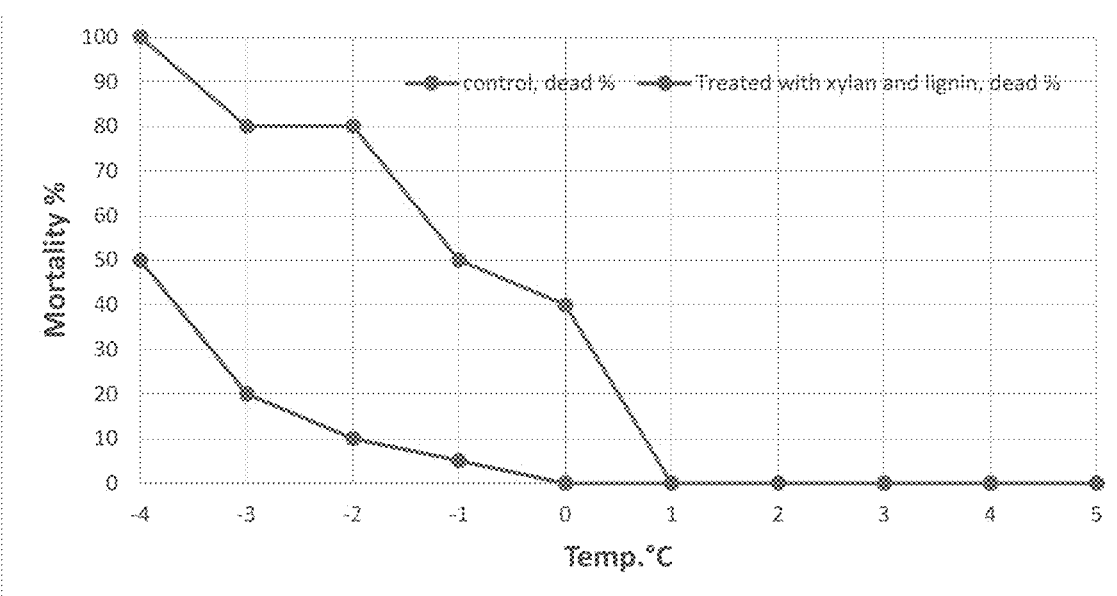

FIG. 4 shows the film samples formed by spraying 2% xylan, 2% xylan & lignin (xylan:lignin 3:2) and 2% nanofibrillated soybean shells (from left to right) on to a solid surface.

The key characteristics of the materials for frost protection include the ability to form a stable dispersion, with a concentration from 0.01% to 50%, can form a hydrophobic deposit (e.g. film, deposit, coating) on plant tissue surface and has a high affinity to the plant tissue surface. All of the three samples exhibited these characteristics.

Cold damage on plant tissue (e.g. buds, leaves) was evaluated on a programmable automated freezer that controls the rate of temperature drop as described in Example 1. Briefly, tissue samples are loaded into perforated aluminum cylinders that are ejected from the freezer at pre-determined temperatures.

Using this system, we evaluated lethal temperatures from 0° C. to −10° C. with 1° C. decrement, with the rate of temperature drop 4° C. $h^{-1}$. This machine has four plastic racks inside the chamber to hold the samples. At the designated temperature the samples are released from the plastic rack to the basket outside the chamber through a door closed with a one-way flap. The samples were removed from the chamber and held for 24 h thawing at room temperature or at 2° C. for 24 h to allow to the sample tissues to thaw slowly and to change the dead tissue to brown color. To make sure that the samples are fully exposed to the freezing temperatures the samples were wrapped with aluminum foil and then placed in perforated cylinders. After exposure of the bud samples to the designated temperatures, the buds were dissected by using a sharp blade under a stereomicroscope (Leica EZ4 HD). The mortality percentage of the bud tissues was analyzed visually by observed the browning tissues of the buds evaluated by the controlled freezing method.

FIG. 5 shows the mortality of cherry buds after spraying treatment with a mixture of xylan and lignin (2% total solid content, with xylan to lignin 3:2) in comparison to non-treated buds. It is apparent that 10-20% of buds died when temperatures dropped to −3° C. whereas all the buds treated by the solution remained alive. When temperatures dropped to −8° C., more than 50% of the treated buds remained viable compared to 100% mortality without the treatment.

In addition to the xylan and lignin mixture, we also found that spraying cherry buds with a 2% xylan (with 0.6% RAINER EA®) solution can also resist an additional 4° C. temperature drop compared to untreated cherry buds. Spraying nano-fibrillated soybean shells on fruit buds also resulted in reducing frost damage.

Figure 7A:
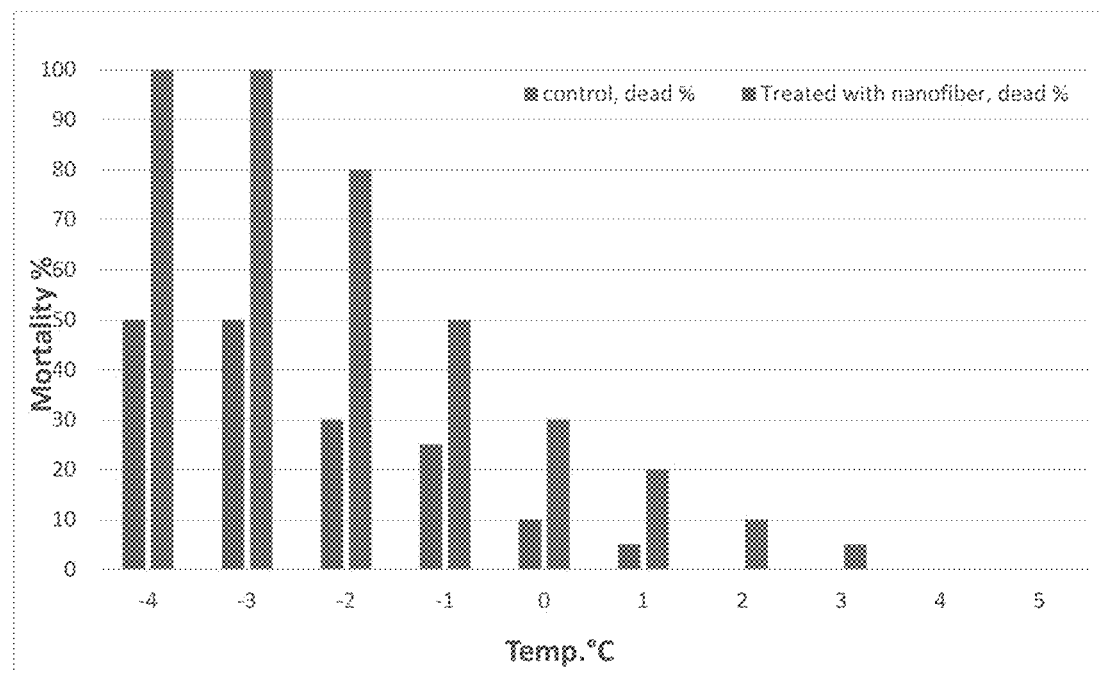
FIGS. 7A and B. Comparison of tomato leave mortality between control samples and samples treated with a dispersion containing 2% nanofiber. A, bar graph; B, line graph.
Figure 7B:
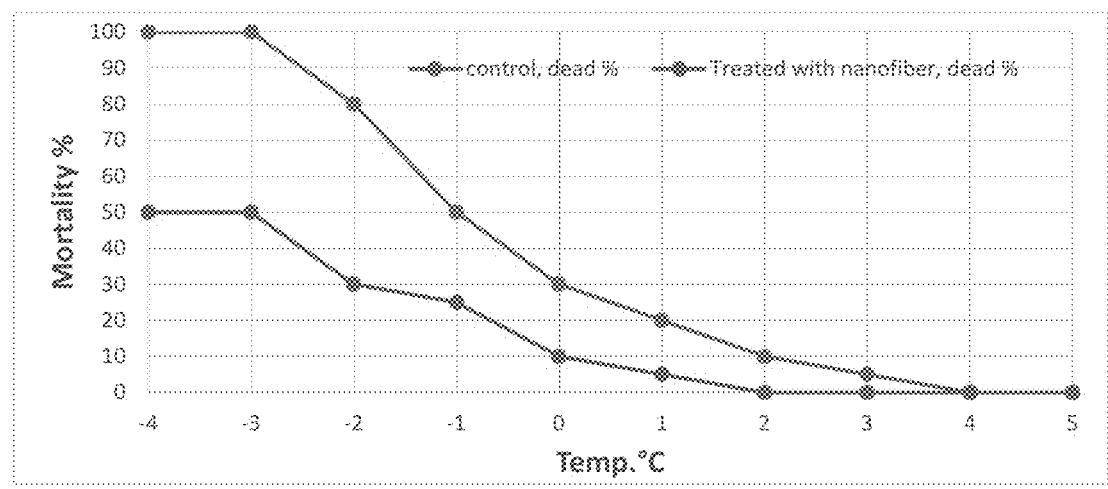

In addition to fruit buds, the plant based dispersion can also prevent ice nucleation on other plant tissue surface and subsequent frost damage. FIG. 6 shows the effect of the same 2% xylan and lignin solution (2% xylan, xylan:lignin 3:2) on frost damage protection on tomato leaves. All the non-treated leaves died when temperature dropped to −4° C. while approximately 50% of the treated leave survived under the same conditions.

We also prepared a plant based dispersion using nanofiber from sawdust. The sawdust (2% solid content) was ground in in a microfluidizer to obtained the nanofiber. The resulting nanofiber solution contains a mixture of cellulose (~50%), mannan (15%), xylan (10%) and lignin (25%). The dispersion contained a large amount of particles in microsize range (at least 50 wt %) i.e. particles that are larger than nanoparticles but are also not visible when applied to a plant, e.g. from 1 and 20 microns, inclusive. Spraying this solution on tomato leaves also resulted in frost protection. As shown in FIG. 7, all the control leaves died when temperature dropped to −4° C., whereas, ~50% treated leaves survived under the same conditions.

The results presented in this Example show that not only nano, but also micron sized particles have efficacy for preventing ice formation

Example 3. Compositions Comprising Cellulose Nanocrystals (CNC)

Cellulose nanocrystals (CNC) represent a new generation of renewable nano-biomaterials with unique physical, chemical and optical properties. CNC can be obtained from a variety of sources including plants, animals, and microorganisms (Siqueira et al. 2010). While the dimensions of the CNC crystal structure differ depending on the source, CNC typically have dimensions of 2-50 nm laterally and 100-2000 nm in length (Habibi et al. 2010; Hamad, 2006). CNC has a strength-to-weight ratio higher than steel, can be drawn into a thin film like layer, and can be produced in a variety of colors (Fernandes et al., 2013).

The thermal conductivity of the CNC (Lavrykov and Ramarao, 2012) is lower than that of other materials used for frost protection, such as an aqueous foam with thermal conductivity of about 0.11 W/mK (Choi et al. 1999); polypropylene insulation with thermal conductivity of about (1225 W/mK (Wadas, 2016; Bhullar, 2012; Hochmuth et al., 1993); polyethylene terephthalate sheets, with thermal conductivity of about 0.29 W/mK (Kipnees and Raszewski, 1991); and low density polyethylene (LDPE), with thermal conductivity of about 0.31 W/mK (Willweth, 2015). This comparison shows that CNC can be used as a thermal barrier since materials with thermal conductivities of ca. 0.2 W/mK at room temperature are commonly considered as thermal barriers or insulators (Singh et al., 2014).

Materials and Methods

Materials

CNC samples are readily obtainable from commercial and other sources. The CNC suspensions were prepared in the Bioproducts, Sciences, and Engineering Laboratory (BSEL) at Washington State University (WSU).

Solution Preparation

Pure CNC Films

Suspensions of CNC self-assemble into chiral nematicon films during slow water evaporation. The thickness of films can be controlled by varying the concentration of the CNC solution. Pure CNC films exhibit low thermal conductivity, and the nanorods of the CNC become compacted together during drying to form a uniform and strong connected film, with low porosity, increasing the thermal insulation property of the films.

Figure 8:
FIG. 8. Fabricated 2 wt. % cellulose nanocrystal (CNC) thin film.

Pure CNC films were prepared by dispersing CNC powder in water and then casting the films at room temperature. Briefly, 98 wt. % water was added to 2 wt. % CNC in a flask and dispersed by stirring for 30 minutes or sonication for 1 hour. The suspension was then cast onto a plastic support (e.g. a 6 cm petri dish) and dried at room temperature and/or in a fume hood to facilitate water evaporation. A transparent film was formed after 4-6 hrs of drying. An exemplary fabricated 2 wt. % CNC film of 39 μm thickness is shown in FIG. 8.

CNC Coating Solution 1 wt. % and 2 wt. %, of CNC were tested as coatings for fruit buds to protect against cold damage. The results indicated that 1 wt. % CNC was not effective as a thermal insulator against low temperature (not shown). However, 2 wt. % CNC was highly effective. The experiments below describe the development and testing of 2 wt. % CNC as a coating applied to buds to protect them from cold damage and maintain viability even after exposure to freezing temperatures.

Figure 9:
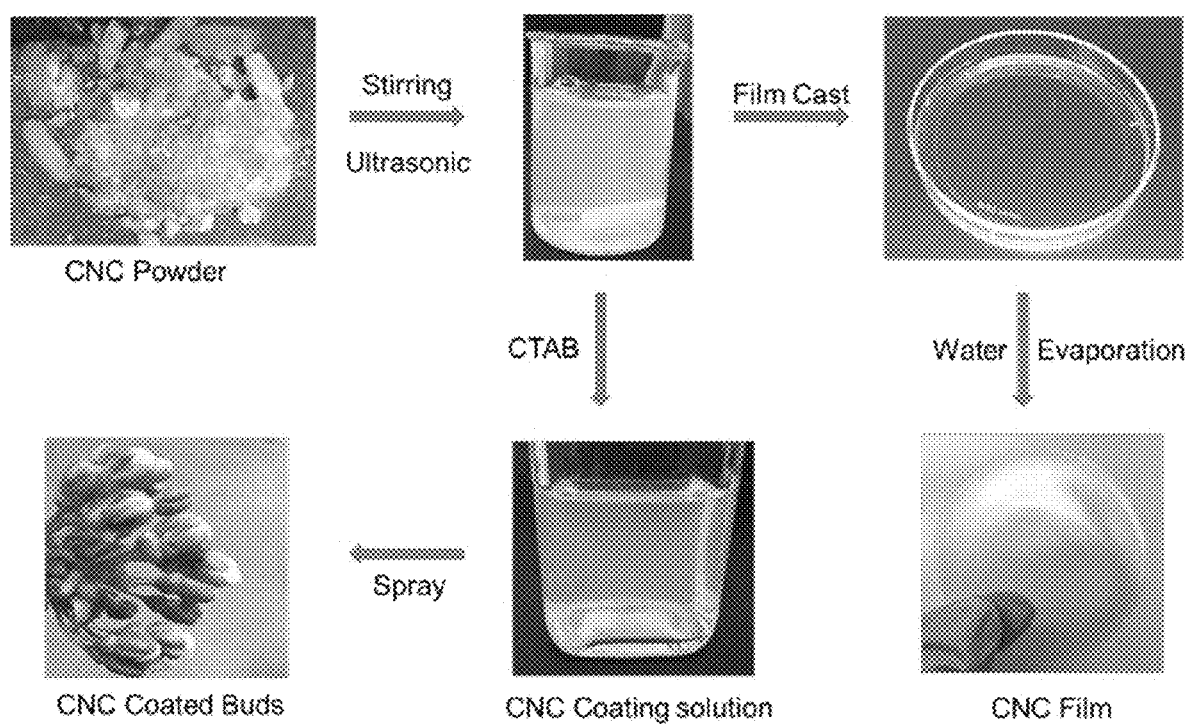
FIG. 9. Schematic of the procedure for making a CNC film and a coating solution for application to plants.

A 2 wt % CNC solution was selected for use as a test coating for fruit buds. To decrease the surface tension of the solution and thus improve the ability of the solution to adhere to the surface of buds, a surfactant was added. Briefly, 0.021 g of the surfactant cetyl trimethylammonium bromide (CTAB) was added to 10 mL water to form a homogeneous solution. 1 mL of the CTAB solution was added to 30 mL 2 wt % CNC solution and the mixture was stirred for 30 min. A schematic of the procedure is depicted in FIG. 9. In the experiments described below, the "2 wt. % CNC suspension" that was used to coat fruit buds included CTAB while that used to form films for thermal conductivity studies did not contain CTAB.

Controls

Control samples in the lab were either treated or treated only with water. In field tests, the controls were not treated by anything. No difference was observed between plants treated with water or those left completely untreated.

Cold-Hardiness Test of Fruit Tree Buds

Differential thermal analyses and controlled freezing experiments were conducted in March and April. The effects of CNC treatment on bud cold hardiness of 'Schneider' and 'Tieton×Sweetheart' sweet cherries and 'Sauvignon Blanc' grapevine buds were determined by applying the 2 wt. % CNC suspension (+CTAB) using a single-nozzle electrostatic sprayer (On Target Spray Systems, Mt. Angel, Oregon).

Field-grown 'Sauvignon Blanc' grape vines were treated with a CNC 2 wt % solution on March 31st, when bud development was in the dormant stage. Treatments were made to 10 replicate vines and treated canes were collected 24 hr after treatment, along with a complement of untreated canes as controls. Four to five buds from either treated or untreated canes were wrapped with aluminum foil and placed directly on a TEM in a tray of the DTA system described above. Four trays were stacked in the climate chamber for a maximum of 35 TEMs loaded per run (about 175 buds).

The same experiment was performed on April $4^{th}$ using a total of 8 branches (four branches from each of two different grape vines). Treated and untreated canes were collected 24 hours after treatment, and four replicate TEMs were conducted per experiment.

A similar experiment using 'Sweetheart×Tieton' cherries was done on April 19th during the "first white" development stage. Five branches from each of two different trees were sprayed with a 2 wt. % CNC solution, and flower clusters from treated and untreated branches were sampled 24 hours after treatment. This provided sufficient plant material for four replicate TEMs per experiment.

A similar experiment using field-grown two-year-old fruiting 'Schneider' sweet cherry trees, also at the 'first white' stage of development, was performed. Six branches (2 branches per tree from three different trees) were sprayed with the CNC solution in April and flower clusters from treated and untreated branches were collected 24 hours later for assessment. This also provided sufficient plant material for four replicate TEMs per experiment.

Figures 10A, 10B, 10C, 10D:
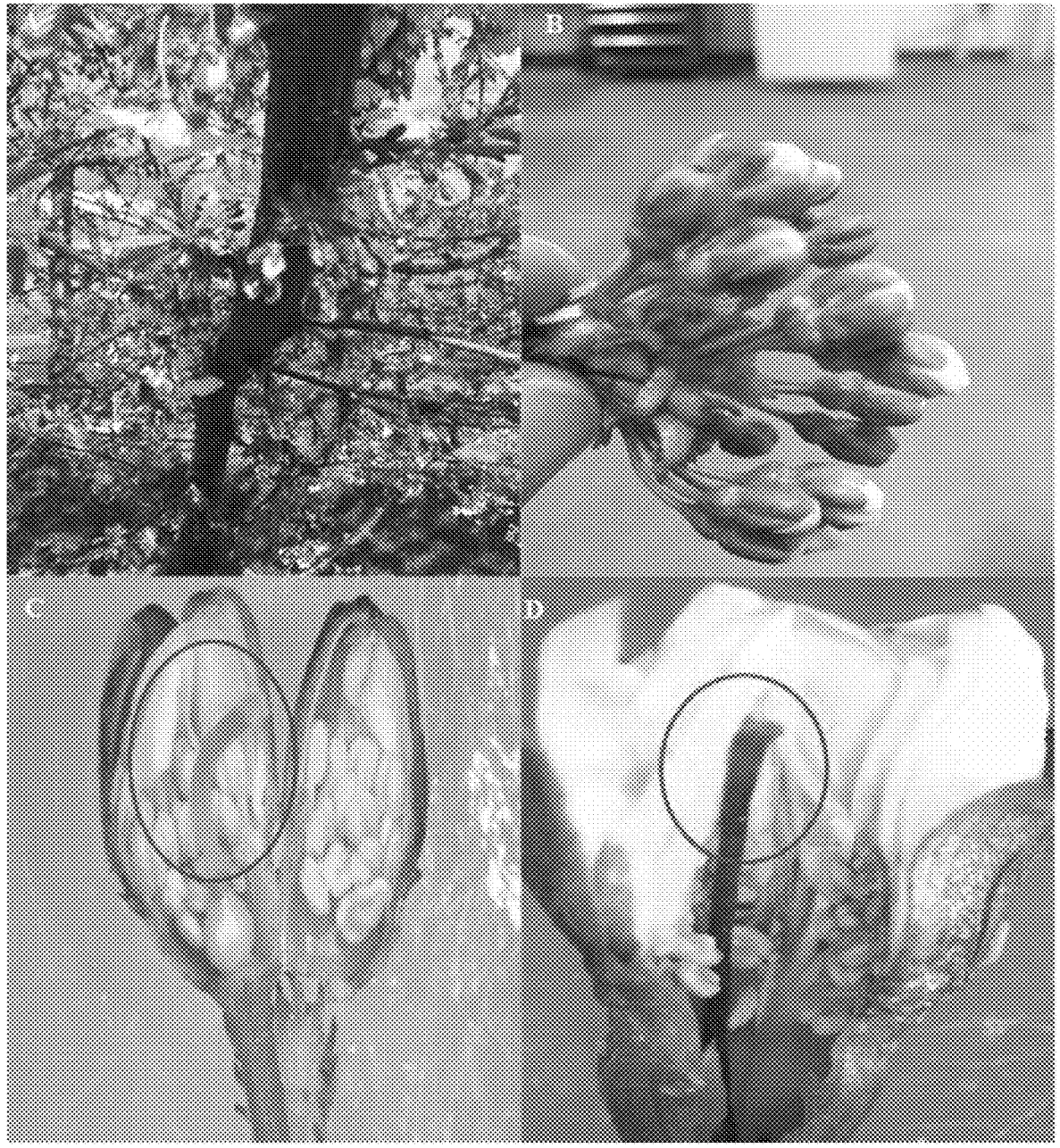
FIG. 10A-D. A, cherry tree after spraying the CNC solution; B, sample of cherry buds collected on April $28^{th}$ before loading inside the climate chamber; C, stereoscopic picture of a cross section of a live cherry bud; D, stereoscopic picture of a cross section of a dead bud killed by exposure to a lethally low temperature.

FIG. 10A depicts a cherry tree after spraying with the CNC solution. Cherry buds in the first white development stage before being loaded into the climate chamber are depicted in FIG. 10B. Stereoscopic pictures of a cross section of live cherry buds are shown in FIG. 10C and cherry buds killed by lethally low temperature are shown in FIG. 10D. A visual stereoscopic evaluation of tissue browning after thawing was used as a measure of the effect of CNC treatment during freezing.

Results and Discussion

Thermal Conductivity Measurement for CNC Film

The average thermal conductivity determined for the CNC film was about 0.061 W/mK which confirms its potential for bud freeze protection. The measured thermal conductivity of the CNC film was also found to be reasonable because it is within the same order of magnitude of the thermal conductivity of copy paper of 0.2 mm thickness (Lavrykov and Ramarao, 2012).

Cold-Hardiness Tests

Grapes

The DTA technique is well-established and has been previously used to determine lethal freezing temperatures of cherry buds and other fruit species including blackberry, peach, pear, and grape (Gutierrez et al., 2016; Gutierrez et al., 2014; Mills et al., 2006). In particular, herein the DTA system was used to evaluate the lethal temperature for frost damage by determining cold-hardiness of grapevine buds and cane tissues. The results showed that the CNC treatment improved the hardiness of grape buds significantly.

'Sauvignon Blanc'

Figure 11A:
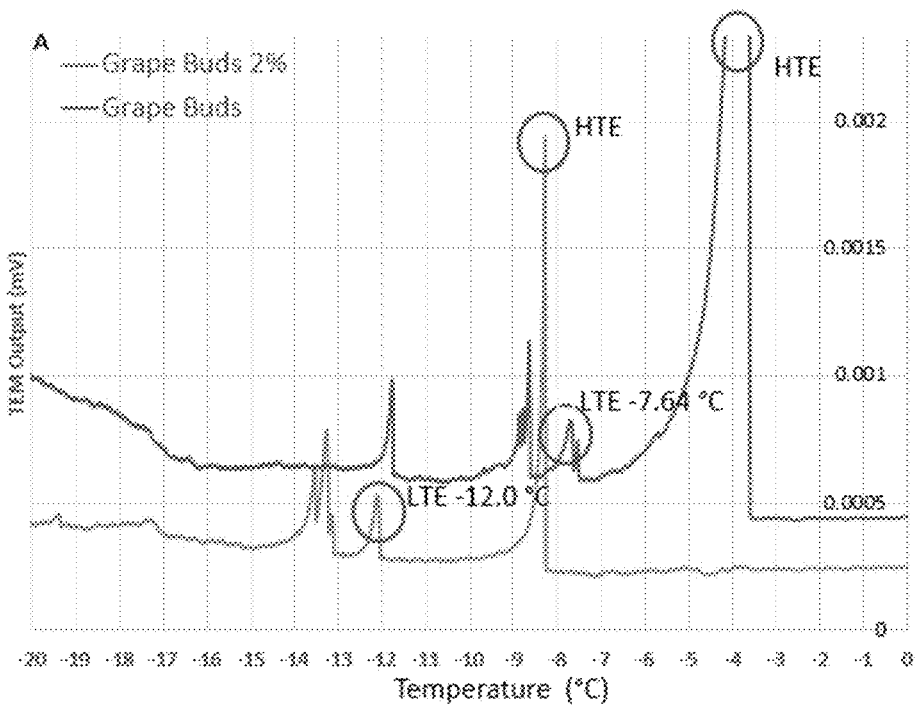
FIGS. 11A and B. The DTA profiles of high temperature exotherms (HTE) showing extracellular freezing nonlethal temperatures and low temperature exotherms (LTE) showing intracellular freezing lethal temperatures. A, freezer temperature vs. voltage output in mV for the tests conducted on March $31^{st}$; B, freezer temperature vs. voltage output in mV for the tests conducted on April $18^{th}$.
Figure 11B:
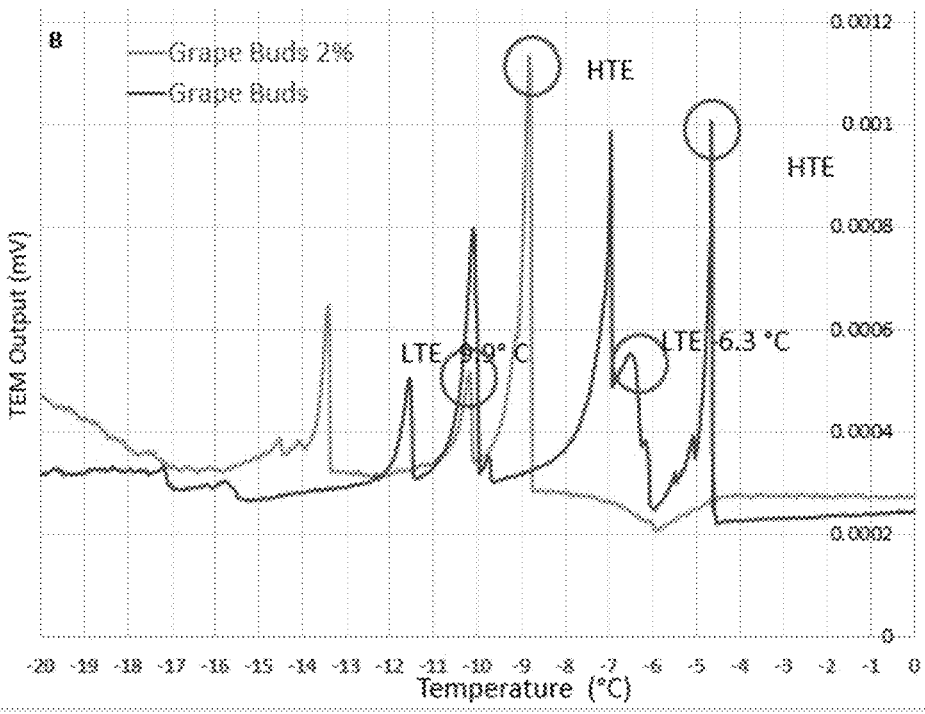

DTA experiments were carried out for 'Sauvignon Blanc' as described above. DTA analyses reveal low temperature exotherms (LTE) of water-buds of ca. −7.6° C. In contrast, the first LTE for buds treated with 2% CNC was ca. −12.0° C. (FIG. 11A). Thus, the CNC application improved hardiness by ca. 4.5° C. In addition, individual buds were hardy to ca. −11.8° C. and −13.5° C. for water-treated and CNC-treated vines, respectively, indicating a nearly 2° C. improvement in hardiness. Similar improvements in bud hardiness were found from a second test conducted on April 19th, in which the first LTE was ca. −6.3° C. and −9.9° C. for the water-treated buds and the CNC treated buds, respectively (FIG. 11B). These results indicate the CNC treatments are effective for improving cold hardiness of grape buds at different stages of development, compared to water-treated buds.

'Schneider' Sweet Cherries

Experiments using the "Vending Machine" controlled freezing method were conducted for 'Schneider' sweet cherry buds at the 'first white' development stage. A solution prepared with 2% cellulose nanocrystals (CNC) and 0.2% cetrimonium bromide (CTAB) was applied to the buds prior to placement in the "Vending Machine". The results are shown in Table 1 and FIGS. 12 and 13.

TABLE 1

Bud survival analyses of 'Schneider' sweet cherry buds treated with 2 wt. % CNC compared to untreated controls. Dead buds were analyzed visually by observing the browning of tissues; sample collected on April 28th.

| Temperature | Control | | Treated with 2 wt. % CNC | |
|---|---|---|---|---|
| ° C. | % Dead | % Live | % Dead | % Live |
| 0 | 0 | 100 | 0 | 100 |
| −1 | 0 | 100 | 0 | 100 |

TABLE 1-continued

Bud survival analyses of 'Schneider' sweet cherry buds treated with 2 wt. % CNC compared to untreated controls. Dead buds were analyzed visually by observing the browning of tissues; sample collected on April 28th.

| Temperature | Control | | Treated with 2 wt. % CNC | |
|---|---|---|---|---|
| ° C. | % Dead | % Live | % Dead | % Live |
| −2 | 20 | 80 | 0 | 100 |
| −3 | 60 | 40 | 0 | 100 |
| −4 | 80 | 20 | 0 | 100 |
| −5 | 80 | 20 | 30 | 70 |
| −6 | 100 | 0 | 40 | 60 |
| −7 | 100 | 0 | 60 | 60 |
| −8 | 100 | 0 | 100 | 0 |
| −9 | 100 | 0 | 100 | 0 |

Figure 12:
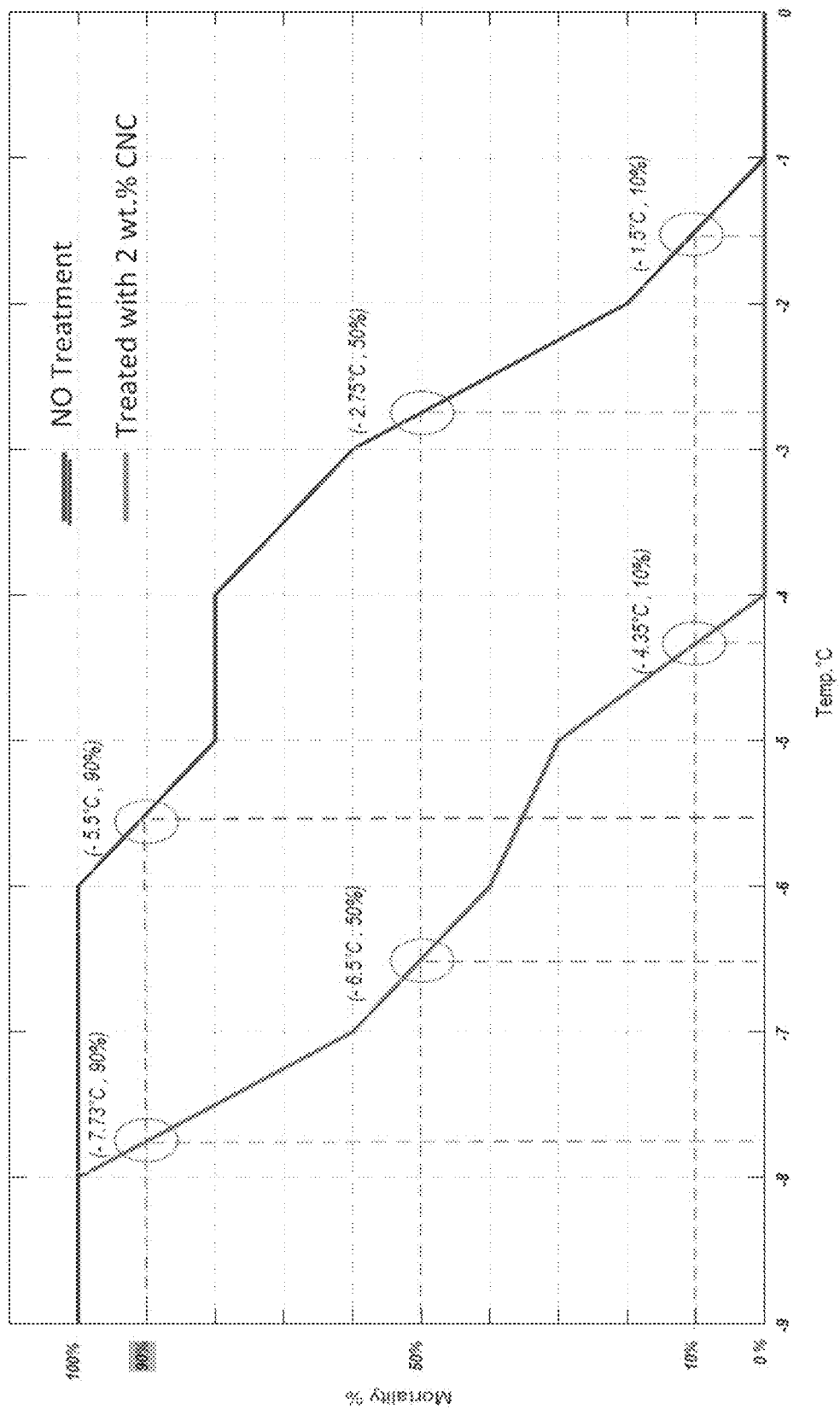
FIG. 12. Observed data and fitted logistic curves for the identification of critical injury temperatures for treated (lower line) and untreated (upper line) 'Schneider' sweet cherry buds collected April $28^{th}$ and evaluated using the controlled freezing method.
Figure 13:
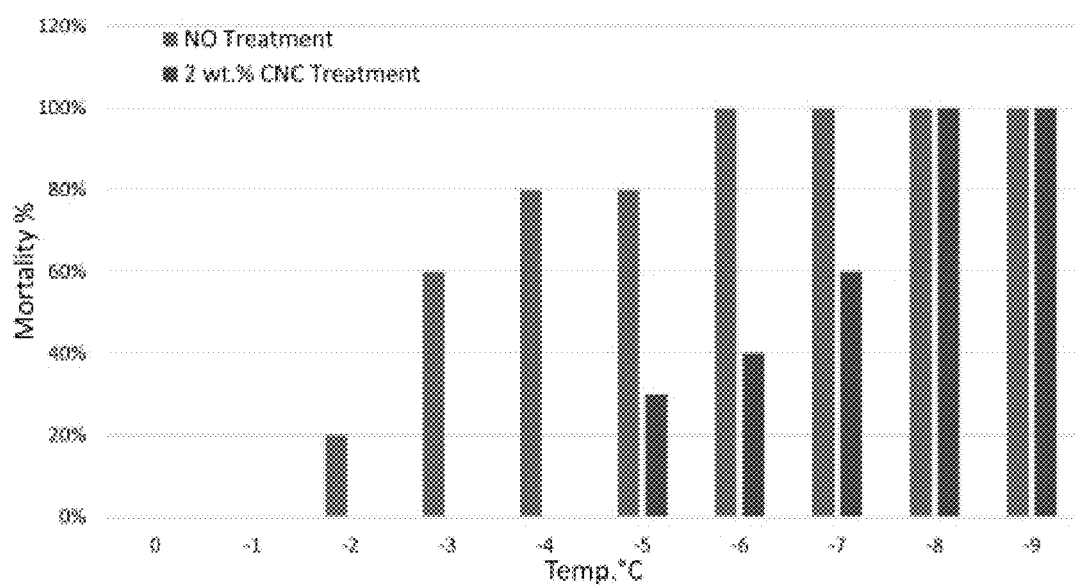
FIG. 13. Mortality percent of 'Schneider' sweet cherry buds treated with 2% mass CNC and non-treated buds sampled and evaluated by the controlled freezing method.

As can be seen, the difference between the treated and untreated buds within a temperature range from 0 to −9° C. is that the untreated buds started dying at −2° C., while the treated buds started dying at −5° C. As shown in FIG. 12 and FIG. 13, this CNC solution showed a significant efficacy on reducing frost damage on cherry buds. Treatment of sweet cherry buds with 2% CNC solution with the addition of CTAB resulted in ~60% survival rate compared to 100% mortality of untreated buds.

The results indicated that the average median critical temperature to kill 10% of the cherry buds (LTE10) was about −4.4° C., the average median critical temperature to kill 50% (LTE50) was about −6.5° C., and the average median critical temperatures to kill 90% (LTE90) was about −7.7° C. For reproductive buds at the 'first white' stage, the average critical temperature to kill 10% (LT10) is about −2.8° C. and the average critical temperature to kill 90% (LT90) is about −4.4° C.

These results show that CNC treatment improves cold hardiness of sweet cherry buds at the 'first white' development stage by 2 to 4° C. In addition, the results of a similar cold-hardiness test for 'Tieton×Sweetheart' cherry buds were the same as those for 'Schneider' cherry buds.

Figure 14:
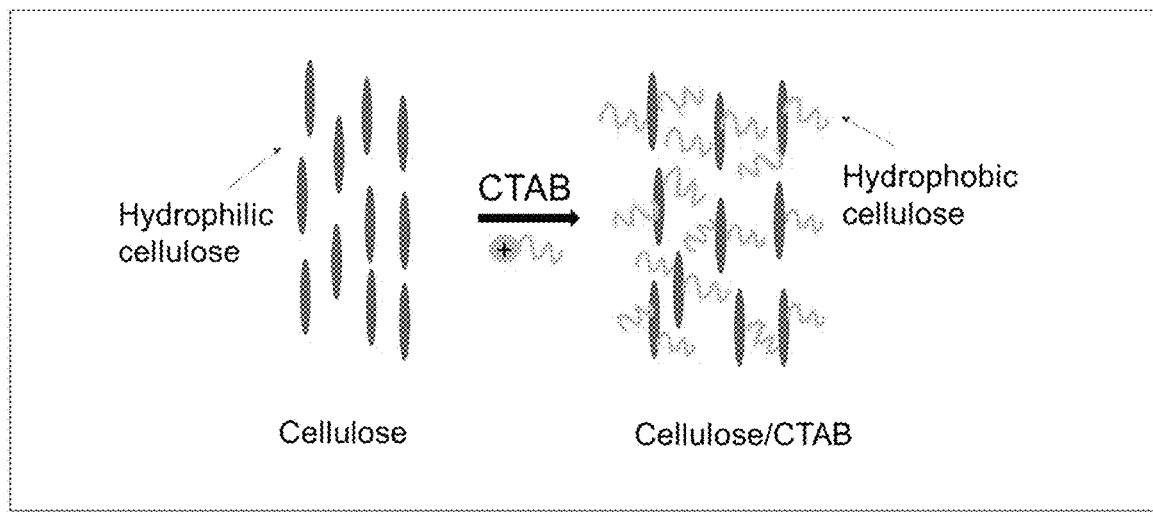
FIG. 14. The addition of cetyl trimethylammonium bromide (CTAB) alter the surface hydrophobicity of cellulose FIG. 15. The addition of lignin or RANIER EA® alters the surface hydrophobicity of xylan.
Figure 15:
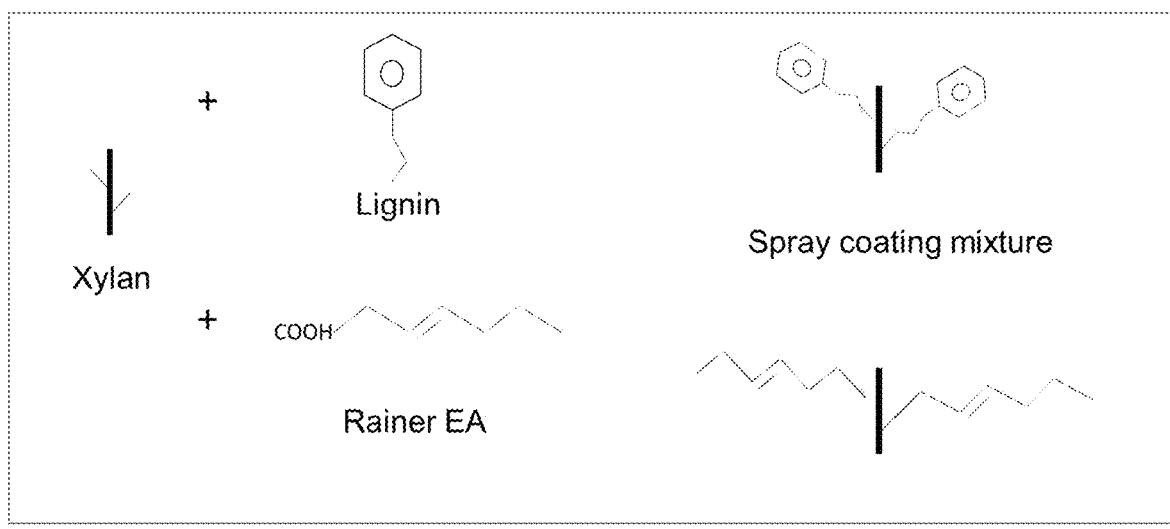

These results are counterintuitive as literature research showed that cellulose material can promote ice formation (Hiranuma et al (a) and (b)). The key may be to incorporate a formulation agent such as CTAB. CTAB contains a long alkane chain which is hydrophobic. It is likely that CTAB can attach to the cellulose surface through its hydrophilic site (FIG. 14). After spraying on the buds, its hydrophobic alkane chain can form deposits and reduce ice nucleation. In addition to CTAB, lignin and Rainer EA, were also tested and shown to have similar efficacy to alter the hydrophilic plant polysaccharides (e.g. cellulose, xylan) with respect to hydrophobic deposits (FIG. 15). In addition to CTAB, lignin and Rainer EA, other compounds including organic acids or surfactants can be used.

Figure 16A:
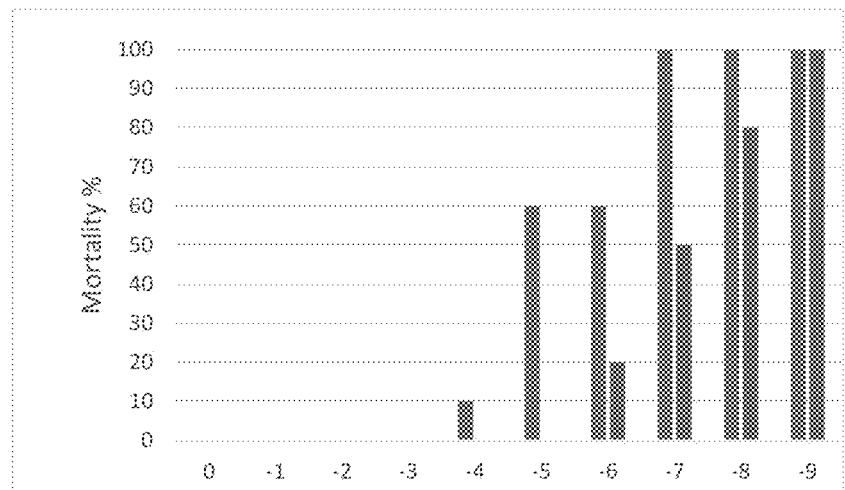
FIGS. 16A and B. Comparison of cherry bud mortality between control samples and samples treated with 2% CNC with 0.2% CTAB. A and B represent replicate experiments.
Figure 16B:
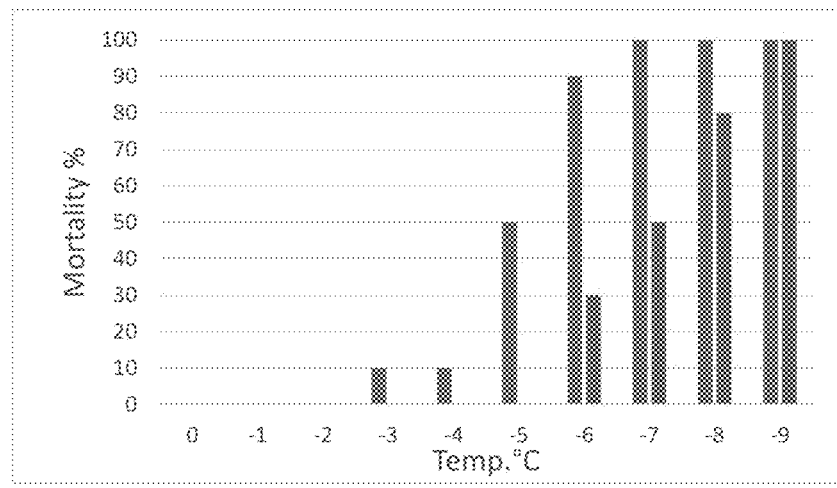

The efficacy of the plant based dispersion treatment on frost protection of buds was tested for reproducibility. As shown in FIGS. 16A and B, spraying CNC with CTAB was conducted on two blocks of cherry trees. Similar results were obtained from both blocks.

Figure 17:
FIG. 17. Infrared images of a treated (2% CNC and 0.2% CTAB) cherry branch with buds (left) and an untreated cherry branch (right).

To provide direct evidence of plant based dispersion can prevent ice nucleation, thermal images of cherry branches with buds were captured in a climate chamber by an infrared thermal camera (ThermaCAM SC 640, FLIR, Switzerland)[27]. FIG. 17 shows an infrared image of a treated (2% CNC and 0.2% CTAB) cherry branch with buds (A) and an untreated cherry branch (B). A lighter color indicates a lower temperature while a darker color indicates a higher temperature.

It is clear, under the same environment, the untreated sample has a lower temperature, suggesting ice formation on tissue surfaces (on both buds and branches), whereas the treated sample maintained at a higher temperature as a result of reduced ice formation.

Conclusions for Example 3

These results show that a field treatment of 2 wt. % CNC improves cold-hardiness of sweet cherry and grapevine buds by at least about 2-4° C. compared to non-treated buds. This level of hardiness is likely to be sufficient to afford significant protection to fruit buds during the frost events in early spring. CNC application is thus a promising, cost-effective and environmentally friendly method for reducing cold damage.

REFERENCES FOR EXAMPLES 1 AND 3

Attaway, J. A. (1997). *History of Florida citrus freezes*: Florida Science Source.

Bartholic, J. (1972). Thin layer foam for plant freeze protection. *Florida Agricultural Experiment Stations Hournal Series No. 4696*, 299-302.

Bhullar, K. S. (2012). Effect of polypropylene covers on frost protection and yield of potato crop. *Journal of Krishi Vigyan*, 1(1), 18-20. Choi, C. Y., Zimmt, W., & Giacomelli, G. (1999).

Freeze and frost protection with aqueous foam: Foam development. *HortTechnology*, 9(4), 661-669.

Duran, N., Paula Lemes, A., & B Seabra, A. (2012). Review of cellulose nanocrystals patents: preparation, composites and general applications. *Recent patents on nanotechnology*, 6(1), 16-28.

Eichhorn, S. J., Dufresne, A., Aranguren, M., Marcovich, N., Capadona, J., Rowan, S., Roman, M. (2010). Review: current international research into cellulose nanofibres and nanocomposites. *Journal of Materials Science*, 45(1), 1.

Evans, R. G. (2000). The art of protecting grapevines from low temperature injury. Paper presented at the Proceedings of the ASEV 50th Anniversary Meeting. Seattle.

Fan, J.-s., & Li, Y.-h. (2012). Maximizing the yield of nanocrystalline cellulose from cotton pulp fiber. *Carbohydrate Polymers*, 88(4), 1184-1188.

Gutiérrez, M. R., Chaves, B., Anothai, J., Whiting, M., & Hoogenboom, G. (2014). Variation in cold hardiness of sweet cherry flower buds through different phenological stages. *Scientia Horticulturae*, 172, 161-167.

Gutiérrez, M. R., Chaves, B., & Hoogenboom, G. (2016). Freezing tolerance of apple flower buds. *Scientia Horticulturae*, 198, 344-351.

Habibi, Y., Lucia, L. A., & Rojas, 0. J. (2010). Cellulose nanocrystals: chemistry, self-assembly, and applications. *Chem Rev*, 110(6), 3479-3500.

Hamad, W. (2006). On the development and applications of cellulosic nanofibrillar and nanocrystalline materials. *The Canadian Journal of Chemical Engineering*, 84(5), 513-519.

Hochmuth, G. J., Locascio, S. J., Kostewicz, S. R., & Martin, F. G. (1993). Irrigation method and row cover use for strawberry freeze protection. *Journal of the American Society for Horticultural Science*, 118(5), 575-579.

Hiranuma (a), et al. *Nature Geoscience* 2015, 8 (4), 273-277.

Hiranuma (b) et al. *Atmospheric Chemistry and Physics* 2019, 19 (7), 4823-4849.

Hu, Y., Liu, P., Asante, E. A., Wu, W., & Li, P. (2016a). Control system of a performance test-bed for frost protection wind machines, *Int J Agric & Biol Eng*, 9(6), 36-43.

Hu, Y., Zhao, C., Liu, P., Asante, E. A., & Li, P. (2016b). Sprinkler irrigation system for tea frost protection and the application effect, *Int J Agric & Biol Eng*, 9(5), 17-23.

Jonoobi, M., Oladi, R., Davoudpour, Y., Oksman, K., Dufresne, A., Hamzeh, Y., & Davoodi, R. (2015). Different preparation methods and properties of nanostructured cellulose from various natural resources and residues: a review. *Cellulose*, 22(2), 935-969.

Kipnees, J. J., & Raszewski, L. R. (1991). *Protective wrapping*: Google Patents.

Krasovitski, B., Kimmel, E., Rozenfeld, M., & Amir, I. (1999). Aqueous foams for frost protection of plants: stability and protective properties. *Journal of Agricultural Engineering Research*, 72(2), 177-185.

Lam, E., Male, K. B., Chong, J. H., Leung, A. C., & Luong, J. H. (2012). Applications of functionalized and nanoparticle-modified nanocrystalline cellulose. *Trends in biotechnology*, 30(5), 283-290.

Lavrykov, S. A., & Ramarao, B. (2012). Thermal properties of copy paper sheets. *Drying Technology*, 30(3), 297-311.

Law, S. E. (2001). Agricultural electrostatic spray application: a review of significant research and development during the 20th century. *Journal of Electrostatics*, 51, 25-42.

Miles, J., & Hinz, W. (1976). Helicopters as frost protection devices. *Transactions of the ASABE*, 19(4), 672-674.

Mills, L. (2006). Cold-hardiness evaluation of grapevine buds and cane tissues. *American Journal of Enology and Viticulture*, 57(2), 194-200.

Oakford, M., Jones, K., Bound, S., & O'Rielly, L. (1994). A comparison of air-shear and electrostatic spray technology with a conventional air-blast sprayer to thin apples. *Animal Production Science*, 34(5), 669-672.

Parsons, L. R., Wheaton, T. A., Faryna, N. D., & Jackson, J. L. (1991). Elevated microsprinklers improve protection of citrus trees in an advective freeze. *HortScience*, 26(9), 1149-1151.

Poling, E. B. (2008). Spring cold injury to winegrapes and protection strategies and methods. *HortScience*, 43(6), 1652-1662.

Revol, J.-F., Bradford, H., Giasson, J., Marchessault, R., & Gray, D. (1992). Helicoidal selfordering of cellulose microfibrils in aqueous suspension. *International journal of biological macromolecules*, 14(3), 170-172.

Schnepf, R. (2017). *U.S. Farm Income Outlook for 2017*. Congressional Research Service, CRS Report R40152.

Singh, V., Bougher, T. L., Weathers, A., Cai, Y., Bi, K., Pettes, M. T., Gattuso, T. R. (2014). High thermal conductivity of chain-oriented amorphous polythiophene. *Nature Nanotechnology*, 9(5), 384-390.

Siqueira, G., Bras, J., & Dufresne, A. (2010). Cellulosic bionanocomposites: a review of preparation, properties and applications. *Polymers*, 2(4), 728-765.

Snyder, R. L. (2005). Frost protection: fundamentals, practice, and economics V1 Wadas, W. (2016). Using nonwoven polypropylene covers in potato production: a review. *Journal of Central European Agriculture*, 17(3).

Warmund, M. R., Guinan, P., & Fernandez, G. (2008). Temperatures and cold damage to small fruit crops across the eastern United States associated with the April 2007 freeze. *HortScience*, 43(6), 1643-1647.

Warmund, M. R., Takeda, F., & Davis, G. A. (1992). Supercooling and Extracellular Ice Formation in Differentiating-Buds of Eastern Thornless Blackberry. *Journal of the American Society for Horticultural Science,* 117(6), 941-945.

Xu, G., LaManna, J., Clement, J., & Mench, M. (2014). Direct measurement of through-plane thermal conductivity of partially saturated fuel cell diffusion media. *Journal of Power Sources,* 256, 212-219.

Yadollahi, A. (2011). Evaluation of reduction approaches on frost damages of grapes grown in moderate cold climate. *African Journal of Agricultural Research,* 6(29), 6289-6295.

REFERENCES FOR EXAMPLE 2

1. Schnepf, R., NASS and US Crop Production Forecasts: Methods and Issues. *J Congressional Research Service Report* 2017.
2. Warmund, M. R.; Guinan, P.; Fernandez, G., Temperatures and cold damage to small fruit crops across the eastern United States associated with the April 2007 freeze. *Hortscience* 2008, 43 (6), 1643-1647.
3. Attaway, J. A., *History of Florida citrus freezes. Florida Science Source:* 1997.
4. L., S., It's official: 2012 worst year on record for Michigan cherry growers. Michigan Radio 2013.
5. Sigler, D., Protecting your fruit from frost and freeze. Fruit Growers News 2013, 25.
6. Snyder, R. L.; Melo-Abreu, J. d. J. F. p. f., practice, Frost protection: fundamentals, practice and economics. Volume 1. *FAO:* 2005; Vol. 1, pp 1-240.
7. Powell, A.; Himelrick, D., Methods of freeze protection for fruit crops. Alabama Cooperative Extension System 2000, 1-9.
8. Jorgensen, G.; Escalera, B.; Wineman, D.; Striegler, R.; Zoldoske, D.; Krauter, C., Microsprayer Frost Protection in Vineyards. CATI Publication 1996, 960803.
9. Battany, M. C., Vineyard frost protection with upward-blowing wind machines. *Agricultural and Forest Meteorology* 2012, 157, 39-48.
10. Poling, E. B., Spring cold injury to winegrapes and protection strategies and methods. *Hortscience* 2008, 43 (6), 1652-1662.
11. Miles, J. A.; Hinz, W. W., Helicopters as Frost Protection Devices. *Transactions of the ASAE* 1976, 19 (4), 672-0674.
12. Evans, R. G. In The art of protecting grapevines from low temperature injury, Proceedings of the ASEV 50th Anniversary Meeting. Seattle, 2000; pp 60-72.
13. Parsons, L. R.; Wheaton, T. A.; Faryna, N. D.; Jackson, J. L., Elevated microsprinklers improve protection of citrus trees in an advective freeze. *HortScience* 1991, 26 (9), 1149-1151.
14. Vakkalanka, M., Sr.; D'Souza, T.; Ray, S.; Yam, K. L.; Mir, N., 7—Emerging packaging technologies for fresh produce. In Emerging Food Packaging Technologies, Yam, K. L.; Lee, D. S., Eds. Woodhead Publishing: 2012; pp 109-133.
15. Lin, D.; Zhao, Y. Y., Innovations in the development and application of edible coatings for fresh and minimally processed fruits and vegetables. Comprehensive Reviews in Food Science and Food Safety 2007, 6 (3), 60-75.
16. Zhao, Y.; Simonson, J.; Cavender, G.; Jung, J.; Fuchigami, L. H. Nano-cellulose edible coatings and uses thereof 2016.
17. Modlibowska, I., Some factors affecting supercooling of fruit blossoms. *Journal of Horticultural Science* 1962, 37 (4), 249-261.
18. Burke, M.; Gusta, L.; Quamme, H.; Weiser, C.; Li, P., Freezing and injury in plants. Annual Review of plant physiology 1976, 27 (1), 507-528.
19. Levitt, J., Responses of Plants to Environmental Stress, Volume 1: Chilling, Freezing, and High Temperature Stresses. Academic Press.: 1980.
20. Nguyen, T. B.; Park, S.; Lim, H., Effects of morphology parameters on anti-icing performance in superhydrophobic surfaces. *Applied Surface Science* 2018, 435, 585-591.
21. Hiranuma, N.; Mohler, O.; Yamashita, K.; Tajiri, T.; Saito, A.; Kiselev, A.; Hoffmann, N.; Hoose, C.; Jantsch, E.; Koop, T.; Murakami, M., Ice nucleation by cellulose and its potential contribution to ice formation in clouds. *Nature Geoscience* 2015, 8 (4), 273-277.
22. Hiranuma, N.; Adachi, K.; Bell, D. M.; Belosi, F.; Beydoun, H.; Bhaduri, B.; Bingemer, H.; Budke, C.; Clemen, H. C.; Conen, F.; Cory, K. M.; Curtius, J.; DeMott, P. J.; Eppers, O.; Grawe, S.; Hartmann, S.; Hoffmann, N.; Hohler, K.; Jantsch, E.; Kiselev, A.; Koop, T.; Kulkarni, G.; Mayer, A.; Murakami, M.; Murray, B. J.; Nicosia, A.; Petters, M. D.; Piazza, M.; Polen, M.; Reicher, N.; Rudich, Y.; Saito, A.; Santachiara, G.; Schiebel, T.; Schill, G. P.; Schneider, J.; Segev, L.; Stopelli, E.; Sullivan, R. C.; Suski, K.; Szakall, M.; Tajiri, T.; Taylor, H.; Tobo, Y.; Ullrich, R.; Weber, D.; Wex, H.; Whale, T. F.; Whiteside, C. L.; Yamashita, K.; Zelenyuk, A.; Mohler, O., A comprehensive characterization of ice nucleation by three different types of cellulose particles immersed in water. *Atmospheric Chemistry and Physics* 2019, 19 (7), 4823-4849.
23. He, M.; Wang, J. J.; Li, H. L.; Song, Y. L., Superhydrophobic surfaces to condensed micro-droplets at temperatures below the freezing point retard ice/frost formation. *Soft Matter* 2011, 7 (8), 3993-4000.
24. Kulinich, S. A.; Farzaneh, M., Ice adhesion on superhydrophobic surfaces. *Applied Surface Science* 2009, 255 (18), 8153-8157.
25. Warmund, M. R.; Takeda, F.; Davis, G. A., Supercooling and Extracellular Ice Formation in Differentiating-Buds of Eastern Thornless Blackberry. *Journal of the American Society for Horticultural Science* 1992, 117 (6), 941-945.
26. Gao, Z.; Li, J.; Zhu, H.; Sun, L.; Du, Y.; Zhai, H., Using differential thermal analysis to analyze cold hardiness in the roots of grape varieties. *Scientia Horticulturae* 2014, 174, 155-163.
27. Hacker, J.; Spindelbock, J. P.; Neuner, G., Mesophyll freezing and effects of freeze dehydration visualized by simultaneous measurement of IDTA and differential imaging chlorophyll fluorescence. *Plant Cell and Environment* 2008, 31 (11), 1725-1733.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of preventing or limiting ice nucleation on buds of a plant, comprising the steps of selecting a plant having a plurality of buds or bud sites, wherein the plant is in a growth stage preceding a fruit set stage;

spraying onto the plant an aqueous composition which includes
at least one of cellulose nanocrystals (CNC) and cellulose nanofibers (CNF) extracted from wood biomass, and
at least one surfactant;
wherein the step of spraying is performed so as to adhere the at least one material onto the buds or bud sites of the plant forming a hydrophobic deposit such that ice nucleation is prevented or limited, and wherein said spraying is performed prior to or during the plant being exposed to freezing temperatures.

2. The method of claim 1, wherein the at least one material is deposited on at least about 10% of the bud surface.

3. The method of claim 1, wherein the plant is selected from the group consisting of fruit trees, vegetable crops and ornamentals.

4. The method of claim 1, wherein the step of spraying is performed at a temperature that is below 0° C.

* * * * *